United States Patent
Lu et al.

(10) Patent No.: US 9,651,695 B2
(45) Date of Patent: May 16, 2017

(54) CONSTRUCTION AND APPLICATION OF ANGLE GATHERS FROM THREE-DIMENSIONAL IMAGING OF MULTIPLES WAVEFIELDS

(71) Applicant: PGS Geophysical AS, Oslo (NO)

(72) Inventors: Shaoping Lu, Houston, TX (US); Norman Daniel Whitmore, Jr., Houston, TX (US); Alejandro Antonio Valenciano Mavilio, Bellaire, TX (US); Nizar Chemingui, Houston, TX (US); Andrew Long, West Perth (AU); Grunde Rønholt, Oslo (NO)

(73) Assignee: PGS Geophysical AS, Oslo (NO)

( * ) Notice: Subject to any disclaimer, the term of this patent is extended or adjusted under 35 U.S.C. 154(b) by 373 days.

(21) Appl. No.: 14/337,957

(22) Filed: Jul. 22, 2014

(65) Prior Publication Data
US 2015/0078124 A1 Mar. 19, 2015

Related U.S. Application Data

(60) Provisional application No. 61/879,936, filed on Sep. 19, 2013, provisional application No. 61/981,147, filed on Apr. 17, 2014.

(51) Int. Cl.
*G01V 1/38* (2006.01)
*G01V 1/36* (2006.01)
*G01V 1/28* (2006.01)

(52) U.S. Cl.
CPC ............... *G01V 1/36* (2013.01); *G01V 1/284* (2013.01); *G01V 1/38* (2013.01); *G01V 2210/56* (2013.01);
(Continued)

(58) Field of Classification Search
CPC ............................. G01V 1/28; G01V 2210/51
(Continued)

(56) References Cited

U.S. PATENT DOCUMENTS

| 5,930,731 A | 7/1999 | Brzostowski |
| 6,026,059 A | 2/2000 | Starr |

(Continued)

FOREIGN PATENT DOCUMENTS

EP 2669713 A2 12/2013

OTHER PUBLICATIONS

Muijs et al., "Prestack depth migration of primary and surface-related multiple reflections: Part I—Imaging", Geophysics, vol. 72, Mar. 2007, pp. 59-69.*

(Continued)

*Primary Examiner* — Ian J Lobo

(57) ABSTRACT

One embodiment relates to a technological process for identifying a potential subsurface structure below a body of water. Three-dimensional seismic sensor data that includes at least two measured components is obtained. Up-going and down-going wavefields comprising multiples wavefields are constructed from the three-dimensional seismic sensor data by applying wavefield separation. The up-going and down-going wavefields are extrapolated to a reflector surface below a water bottom. An imaging condition is applied at the reflector surface to generate images that include information from the multiples wavefields. Angle gathers are constructed, where each angle gather is constructed by gathering the images generated using the multiples wavefields for a range of illumination angles. Other embodiments, aspects and features are also disclosed.

23 Claims, 22 Drawing Sheets

(52) U.S. Cl.
CPC .... *G01V 2210/632* (2013.01); *G01V 2210/74* (2013.01)

(58) Field of Classification Search
USPC .......................................... 367/24, 38, 50, 51
See application file for complete search history.

(56) References Cited

U.S. PATENT DOCUMENTS

| | | | |
|---|---|---|---|
| 6,438,069 | B1 | 8/2002 | Ross et al. |
| 6,463,388 | B1 | 10/2002 | Martinez |
| 6,574,567 | B2 | 6/2003 | Martinez |
| 6,826,484 | B2 | 11/2004 | Martinez et al. |
| 6,889,142 | B2 | 5/2005 | Schonewille |
| 7,039,526 | B2 | 5/2006 | Kelly |
| 7,123,543 | B2 | 10/2006 | Vaage et al. |
| 7,359,283 | B2 | 4/2008 | Vaage et al. |
| 7,505,361 | B2 | 3/2009 | Sollner |
| 7,548,487 | B2 | 6/2009 | Barnes |
| 7,672,195 | B2 | 3/2010 | Barnes |
| 7,684,281 | B2 | 3/2010 | Vaage et al. |
| 7,830,747 | B2 | 11/2010 | Sollner |
| 7,969,818 | B2 | 6/2011 | Burren |
| 8,126,652 | B2 | 2/2012 | Aaron et al. |
| 8,174,926 | B2 | 5/2012 | Kluver |
| 8,208,342 | B2 | 6/2012 | Kluver et al. |
| 8,300,498 | B2 | 10/2012 | Hegge et al. |
| 8,456,949 | B2 | 6/2013 | Cambois |
| 8,478,531 | B2 | 7/2013 | Aaron et al. |
| 2003/0187583 | A1 | 10/2003 | Martin et al. |
| 2004/0093163 | A1* | 5/2004 | Reshef ................... G01V 1/362 702/14 |
| 2010/0027375 | A1 | 2/2010 | Barr, Jr. |
| 2010/0039891 | A1 | 2/2010 | Cambois |
| 2011/0242937 | A1 | 10/2011 | Sollner et al. |
| 2011/0292761 | A1 | 12/2011 | Jiao et al. |
| 2012/0095690 | A1* | 4/2012 | Higginbotham ......... G01V 1/28 702/18 |
| 2013/0121109 | A1 | 5/2013 | Baardman et al. |
| 2013/0322205 | A1* | 12/2013 | Widmaier ............ G01V 1/3808 367/16 |
| 2014/0119157 | A1 | 5/2014 | Whitmore, Jr. et al. |
| 2014/0121977 | A1 | 5/2014 | Lecocq |

OTHER PUBLICATIONS

UK Search Report mailed Feb. 27, 2015, in the prosecution of Application No. GB1416562.5, 4 pages.
Shaoping Lu et al., "Illumination from 3D Imaging of Multiples: an Analysis in the Angle Domain", SEG Denver Annual Meeting, 2014, pp. 3930 thru 3934.
Antoine Guitton "Shot-profile migration of multiple reflections", 2002, 4 sheets, 72nd Annual International Meeting, SEG Expanded Abstract 1296-1299.
N.D. Whitmore, Alejandro A. Valenciano, Shaoping Lu, and N. Chimengui "Imaging of primaries and multiples with image space surface related multiple elimination", May 23-26, 2011, 5 sheets, 73rd EAGE Conference & Exhibition incorporating SPE EUROPEC 2011, Viena, Austria.
N.D. Whitmore, A.A. Valenciano, and Walter Söllner "Imaging of primaries and multiples using a dual-sensor towed streamer", 2010 SEG, pp. 3187-3192, 80th Annual International Meeting, Expanded Abstract.
D. J. Verschuur and A.J. Berkout "Seismic migration of blended shot records with surface-related scattering", Jan.-Feb. 2011, pp. A7-A13, Geophysics, vol. 76, No. 1.
James E. Rickett and Paul C. Sava "Offset and angle-domain common image-point gathers for shot-profile migration", May-Jun. 2002, pp. 883-889, Geophysics, vol. 67, No. 3.
Remco Muijs, Johan O.A. Robertsson, and Klaus Holliger "Prestack depth migration of primary and surface related multiple reflections: Part I—Imaging", Mar.-Apr. 2007, pp. S59-S69, Geophysics, 72, No. 2.
Shaoping Lu, N.D. Whitmore, and A.A. Valenciano "Challenges and Opportunities in 3D Imaging of Sea Surface Related Multiples", Sep. 23, 2013, pp. 4111-4115, SEG Houston 2013 Annual Meeting.
Shaoping Lu, N.D. Whitmore, and Alejandro Valenciano "Challenges and Opportunities in 3D Imaging of Sea Surface Related Multiples", Sep. 23, 2013, pp. 1-73, A Clearer Image.

* cited by examiner

Image (subsurface offset) gathers from using cross correlation imaging condition :

$$\text{Image}_{ss\_offset}(\bar{x},\bar{h}) = \sum_{\omega} U(\bar{x},\omega,\bar{x}+\bar{h}) * D^*(\bar{x},\omega,\bar{x}-\bar{h}) \quad (1.1)$$

$$\text{Image}_{ss\_offset}(\bar{x},\bar{h}) = \sum_{t} U(\bar{x},t,\bar{x}+\bar{h}) * D(\bar{x},t,\bar{x}-\bar{h}) \quad (1.2)$$

Image (subsurface offset) gathers from using deconvolution imaging condition :

$$\text{Image}_{ss\_offset}(\bar{x},\bar{h}) = \sum_{\omega} \frac{U(\bar{x},\omega,\bar{x}+\bar{h}) * D^*(\bar{x},\omega,\bar{x}-\bar{h})}{D(\bar{x},\omega,\bar{x}-\bar{h}) * D^*(\bar{x},\omega,\bar{x}-\bar{h})} \quad (1.3)$$

Image gathers from subsurface offset domain to angle domain :

$$\text{Image}_{ss\_offset}(\bar{x},\bar{h}) \xrightarrow{\text{subsurface offset to angle}} \text{Image}_{angle}(\bar{x},\phi,\varphi) \quad (2)$$

$\bar{x} = (x,y,z)$ is the subsurface coordinate $\bar{h} = (h_x, h_y, h_z)$ is the half source-receiver offset for generating image gathers

FIG. 2

CONSTRUCTION AND APPLICATION OF ANGLE GATHERS FROM THREE-DIMENSIONAL IMAGING OF MULTIPLES WAVEFIELDS

CROSS-REFERENCE TO RELATED APPLICATIONS

The present patent application claims the benefit of U.S. Provisional Patent Application No. 61/981,147, filed Apr. 17, 2014, the disclosure of which is hereby incorporated by reference. The present patent application also claims the benefit of U.S. Provisional Patent Application No. 61/879,936, filed Sep. 19, 2013, the disclosure of which is hereby incorporated by reference.

BACKGROUND OF THE INVENTION

This disclosure relates generally to seismic exploration, with particular applicability to marine seismic exploration.

In seismic exploration, seismic data may be acquired by imparting acoustic energy into the earth near its surface, and detecting acoustic energy that is reflected from boundaries between different layers of a subsurface rock formation. Acoustic energy is reflected when there is a difference in acoustic impedance between adjacent layers to a boundary. Signals representing the detected acoustic energy are interpreted to identify potential subsurface structures and composition of the subsurface rock formation, thereby to aid in the identification and production of hydrocarbons.

In marine seismic exploration, a seismic energy source, such as an air gun, marine vibrator, or arrays of airguns and/or marine vibrators, is typically used to impart the acoustic energy into the formations below the bottom of the water. The seismic energy source is actuated at a selected depth in the water, typically while the seismic energy source is being towed by a vessel. The same or a different vessel tows one or more seismic sensor cables, called streamers, in the water. Generally the streamer extends behind the vessel along the direction in which the streamer is towed. Typically, a streamer includes a plurality of seismic sensors, such as hydrophones, for example, disposed on the cable at spaced apart, known positions along the cable. Hydrophones are seismic sensors that generate an optical or electrical signal corresponding to the pressure of the water or the time gradient of pressure in the water. Seismic sensors may also be located at or near the bottom of the body of water, on one or more ocean bottom cables or a plurality of nodes. The vessel that tows the one or more streamers typically includes recording equipment to make a record, indexed with respect to time, of the signals generated by the seismic sensors in response to the detected acoustic energy. The record of signals may be processed to infer structures of and compositions of the earth formations below the locations at which the seismic survey is performed.

BRIEF DESCRIPTION OF THE DRAWINGS

The invention and its advantages may be more easily understood by reference to the following detailed description and the attached drawings, in which:

FIG. 2 shows a set of equations according to this disclosure.

Figure 1:
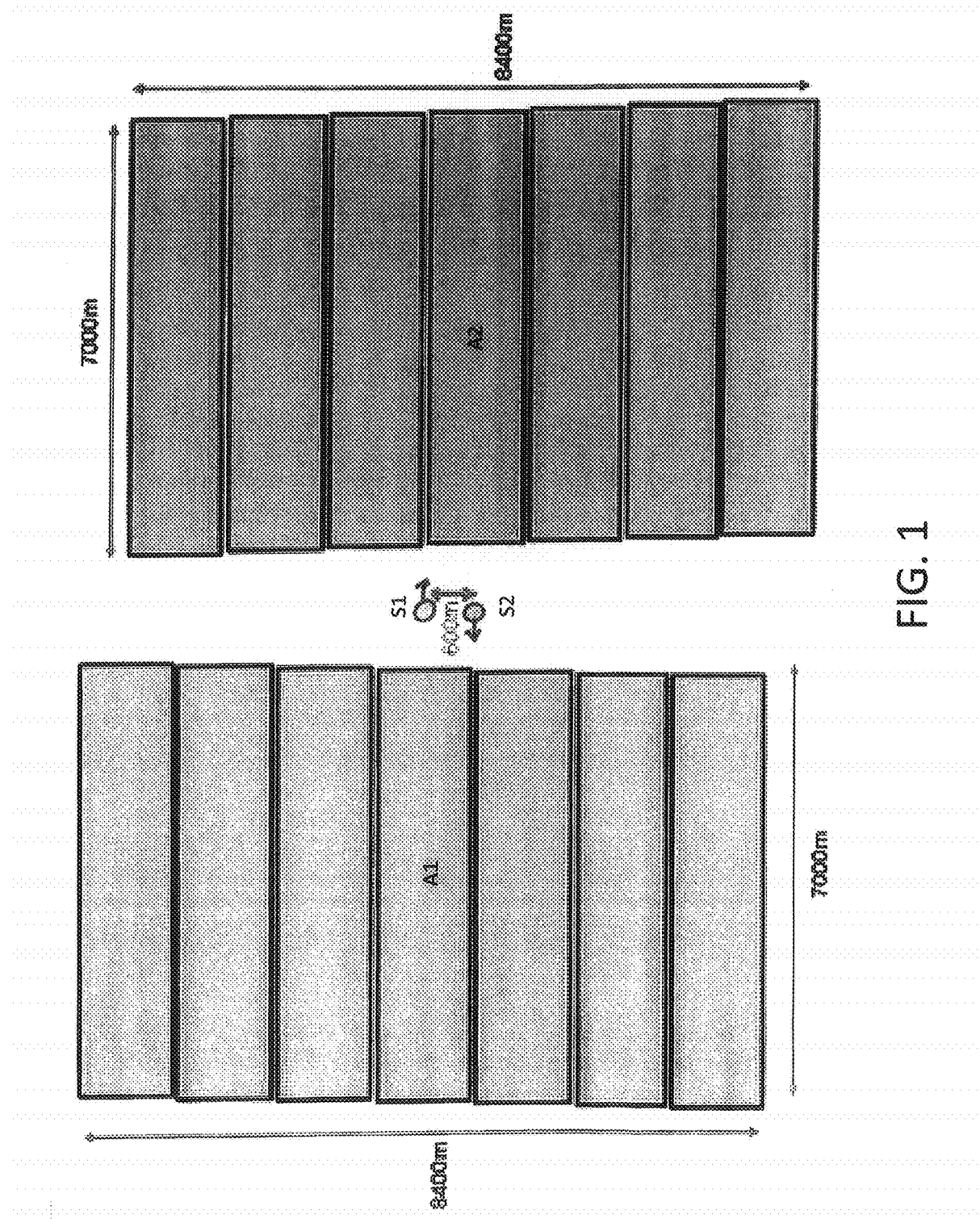
FIG. 1 is a diagram showing an exemplary acquisition geometry which may be used to acquire three-dimensional seismic sensor data in accordance with an embodiment of the invention.

While the invention will be described in connection with one or more embodiments, it will be understood that the invention is not limited to these. On the contrary, the invention is intended to cover all alternatives, modifications, and equivalents that may be included within the scope of the invention, as defined by the appended claims.

DETAILED DESCRIPTION

It is a goal of seismic imaging to produce quality images of subsurfaces of the Earth. These subsurface images may be interpreted to identify potential structures and composition of subsurface rock formation. Such knowledge of the potential subsurface structures is very useful for identifying and producing hydrocarbons efficiently.

One problem in conventional methods of seismic imaging is the limited quality and accuracy of the seismic images. The present disclosure provides technological processes which may improve the quality and accuracy of such images.

Conventional seismic imaging typically processes the acquired data to remove multiples wavefields and uses the primary wavefields to generate the seismic images. Multiples wavefields are multiplicative events seen in seismic sections. These events have undergone more than one reflection. They are produced in the data gathering process when the signal does not take a direct path from the seismic energy source to the geologic event and finally back to the seismic sensor.

In contrast, the present disclosure provides technological processes which, instead of removing the multiples wavefields, uses them to demonstrably improve the quality and accuracy of the seismic images. The demonstrated improvement in the seismic images with the presently-disclosed technique may be due to the multiples wavefields providing information from subsurface reflections at further illumination angles.

Conventional seismic imaging with primary wavefields from three-dimensional seismic sensor data generates subsurface images using reflections from the subsurface with limited angular illumination. This is because angular illumination is shot density dependent, which results in particularly poor angular illumination in three-dimensional acquisitions, especially in the crossline (90 degree azimuth) direction. The shot separation in the crossline direction is typically about 500 meters for imaging of primary wavefields, which is bad for angular illumination at the 90-degree azimuth (i.e. in the crossline direction).

The presently-disclosed technique effectively increases the illumination angles that are used in seismic imaging from three-dimensional seismic sensor data. This is accomplished by utilizing the multiples wavefields that are normally removed in conventional seismic imaging. It may be considered that this technique utilizes the down-going wavefield as a secondary "aerial" (i.e. distributed) source which effectively results in a greater shot density (compared against the conventional shot density with imaging of primary wavefields).

In accordance with an embodiment of the invention, the multiples wavefield data may be used to generate angle-domain image gathers (also referred to herein as "angle gathers") alone or in combination with the primary wavefield data. As demonstrated herein, this technique may advantageously improve accuracy and clarity in the resultant seismic images. The improved seismic images may then be utilized to more accurately identify a potential subsurface structure for use in hydrocarbon exploration.

FIG. 1 is a diagram showing an exemplary acquisition geometry which may be used to acquire three-dimensional dual-sensor data in accordance with an embodiment of the invention. The exemplary acquisition geometry shown is a deep-water, anti-parallel wide-azimuth acquisition geometry. As would be understood by one of ordinary skill in the art with the benefit of this disclosure, suitable alternatives to dual-sensor data acquisition would be any multi-sensor data acquisition which allows a mathematical separation of the up-going wavefields and down-going wavefields.

The rectangular areas in FIG. 1 indicate various positions for an array of seismic sensors that are towed in an inline direction (horizontal in the figure) during the acquisition. The array positions on the right side are offset by half an array width in the crossline direction (vertical in the figure) from the array positions on the left side. The rectangles on the left side indicate array positions as the array is being towed to the right, and the rectangles on the right side indicate array positions as the array is being towed towards the left.

A seismic energy source is also towed, such that the relative position between the seismic energy source and array is constant or fixed. One example source position (S1) is shown that is a fixed relative position in front of one array position (A1) for towing to the right, and another example source position (S2) is shown that is a fixed relative position in front of one array position (A2) for towing to the left.

The seismic sensor array may be implemented using multiple streamers, where each streamer includes multiple seismic sensors spaced along the streamer. In the illustrated example, each streamer may be 7000 meters long (inline direction), and the distance between streamers at the top and bottom edges of the array is 1200 meters (crossline direction).

In this example, the positional offset in the crossline direction between the array positions on the left and right sides of FIG. 1 is 600 meters (half the array width of 1200 meters). Stacks and angle gathers may be both obtained from using every super shot (for example, with 150 meter inline spacing between detectors and 600 meter crossline shot spacing). As would be understood by one of ordinary skill in the art with the benefit of this disclosure, any wide azimuth array configuration may be suitable for data acquisition, including configurations where the seismic sensor array is towed along a curved path, and including configurations wherein the seismic sensor array not towed, but rather is located at or near the seafloor.

FIG. 2 shows a set of equations according to this disclosure. Equations (1.1), (1.2) and (1.3) provide a formulation of the subsurface offset image gathers ($Image_{ss\_offset}$). Each of Equations (1.1), (1.2) and (1.3) provides the image gather at the subsurface coordinate vector $\vec{x}=(x, y, z)$ and the half source-sensor offset vector $\vec{h}=(h_x, h_y, h_z)$ (also referred to herein as the "offset vector" or the "offset").

The subsurface offset image gather of Equation (1.1) is computed by cross-correlating the up-going (U) and down-going (D) wavefields in the frequency ($\omega$) domain, and the subsurface offset image gather of Equation (1.2) is computed cross-correlating the U and D wavefields in the time (t) domain. The subsurface offset image gather of Equation (1.3) is computed using a deconvolution imaging condition in the frequency ($\omega$) domain.

Equation (2) depicts the transformation of the image gather in the subset offset domain, $Image_{ss\_offset}(\vec{x}, \vec{h})$, to the angle gather in the angle domain, $Image_{angle}(\vec{x}, \phi, \varphi)$. The angle domain is represented by the polar angle $\phi$ and the azimuth angle $\varphi$ of a spherical coordinate system.

FIGS. 3A, 4A, 5A, 6A, 7A and 8A show various angle gathers from primary wavefields from an example set of deep-water, wide-azimuth acquired seismic data. FIGS. 3B, 4B, 5B, 6B, 7B and 8B show corresponding angle gathers from multiples wavefields from the same set of acquired seismic data.

In each of these figures, the vertical axis represents the depth z in meters, and each panel shows angle gathers at one surface (x,y) location of a series of depths. The horizontal (X) position is varied in a linear manner from one panel to a next panel. In other words, different panels correspond to different surface (x,y) locations.

The azimuthal angle is fixed at 0 degrees (inline) for FIGS. 3A, 3B, 4A, 4B, 5A and 5B. The azimuthal angle is fixed at 90 degrees (crossline) for FIGS. 6A, 6B, 7A, 7B, 8A and 8B.

Within each panel in FIGS. 3A, 3B, 6A and 6B, the polar angle of the offset varies from −70 degrees on the left edge of the panel (indicated by the "A" line under the graphic) to +70 degrees on the right edge of the panel. Within each panel in FIGS. 4A, 4B, 7A and 7B, the polar angle of the offset varies from −25 degrees on the left edge of the panel (indicated by the "A" line under the graphic) to +25 degrees on the right edge of the panel. Within each panel in FIGS. 5A, 5B, 8A and 8B, the polar angle of the offset varies from −70 degrees on the left edge of the panel to +70 degrees on the right edge of the panel.

Figure 3A:
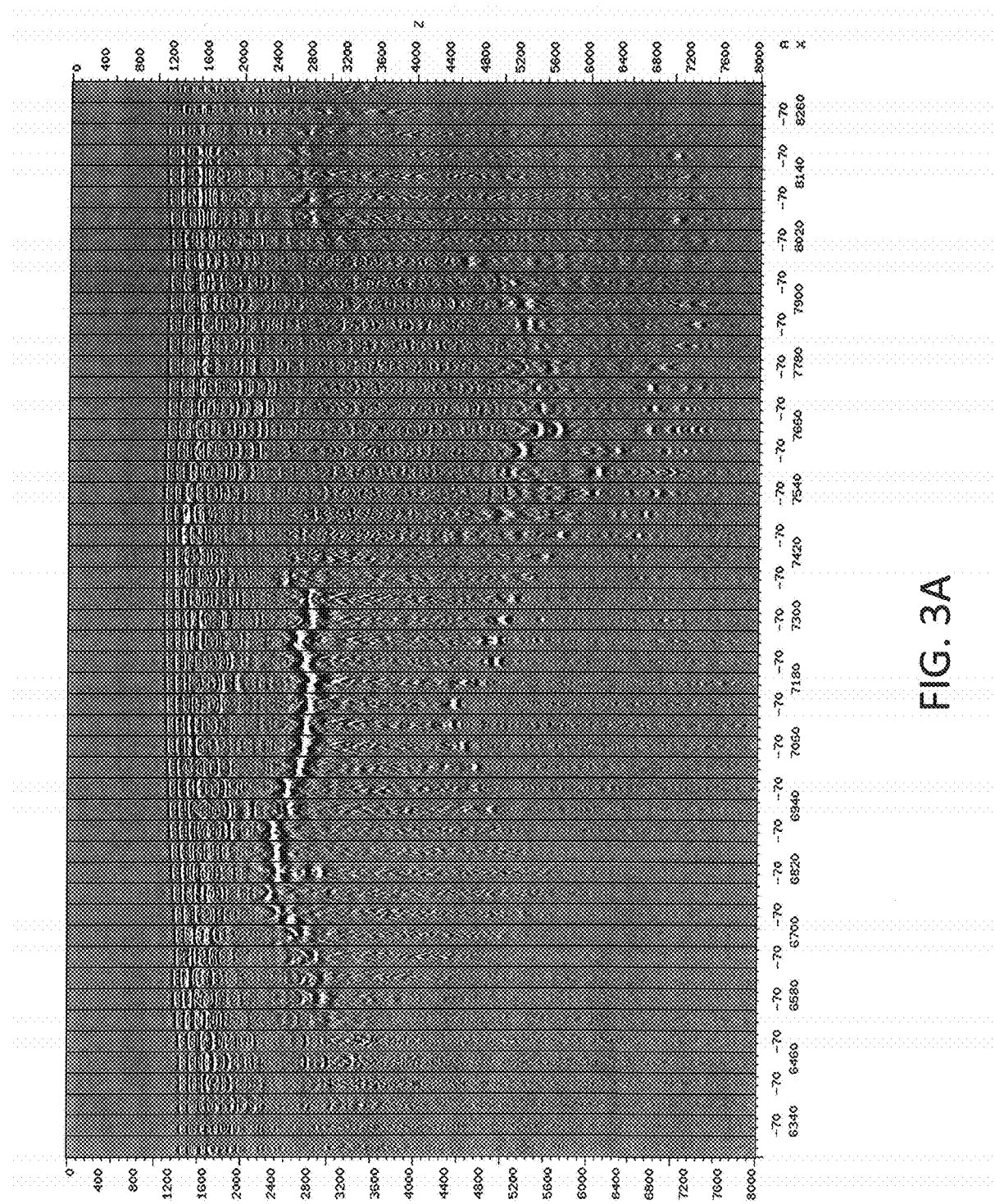
FIG. 3A shows a first example of angle gathers from primary wavefields at a fixed azimuth angle of zero degrees.
Figure 3B:
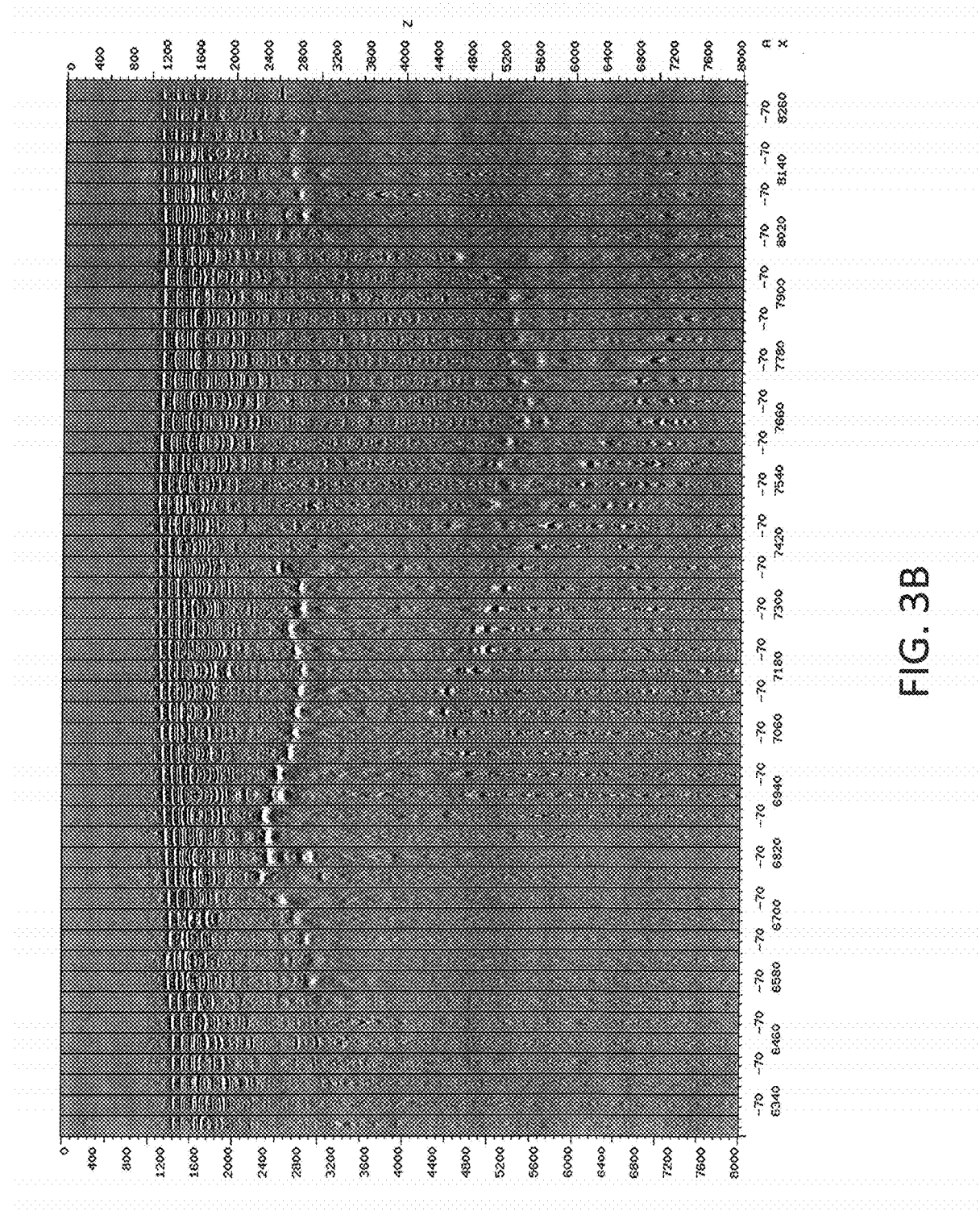
FIG. 3B shows a first example of angle gathers from multiples wavefields at a fixed azimuth angle of zero degrees in accordance with an embodiment of the invention.

A comparison between FIGS. 3A and 3B shows that the features are more finely sampled and flatter in appearance within each panel in FIG. 3B. For example, consider the bright feature that is approximately horizontal at a depth of roughly 2400-2800 meters at a range of inline positions (indicated by the "X" line under the graphic) of about 6700-7400 meters. That bright feature is seen to be distorted towards the edges of each panel in FIG. 3A, while being more finely sampled and flatter in appearance in each panel in FIG. 3B.

Figure 4A:
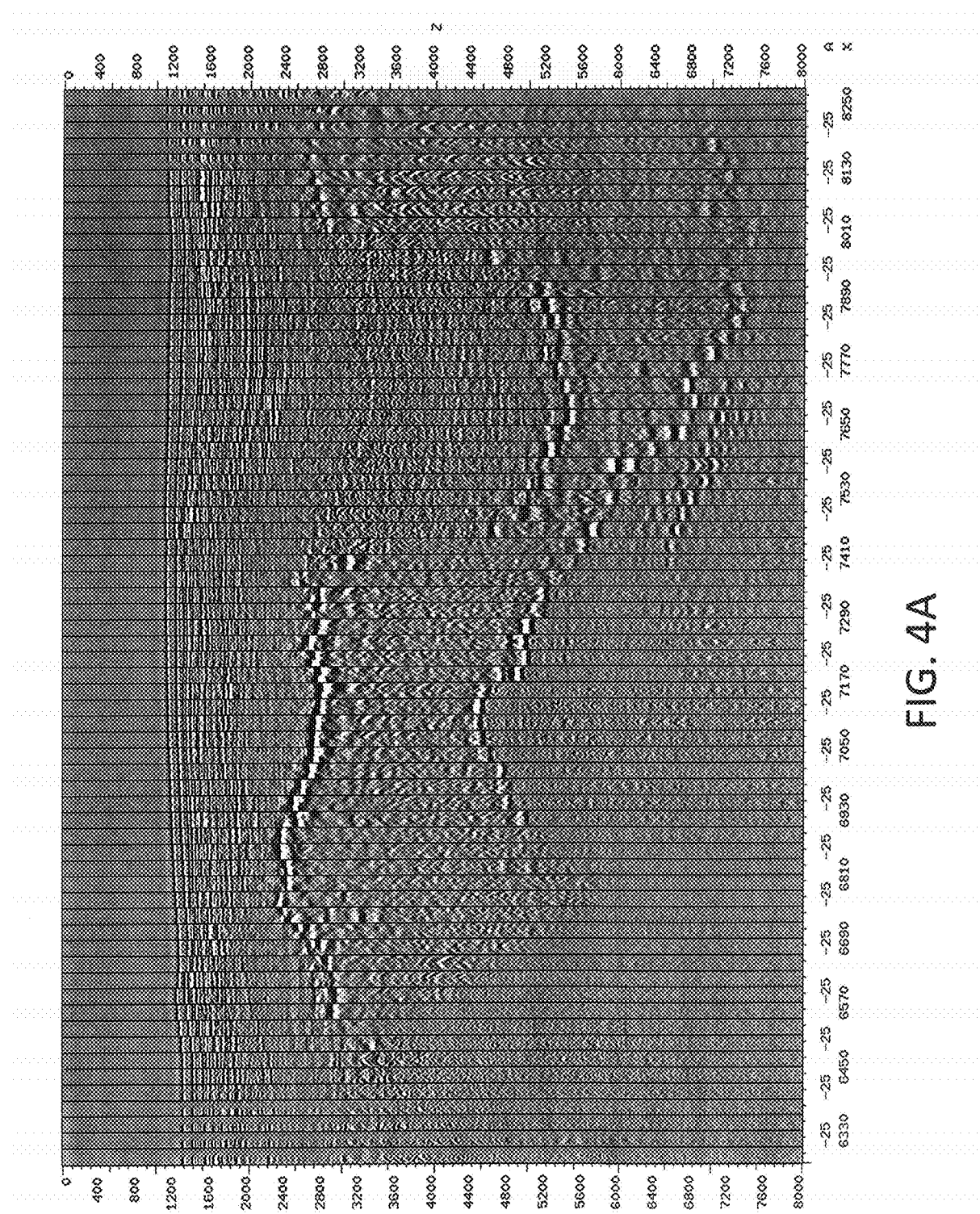
FIG. 4A shows a second example of angle gathers from primary wavefields at a fixed azimuth angle of zero degrees.
Figure 4B:
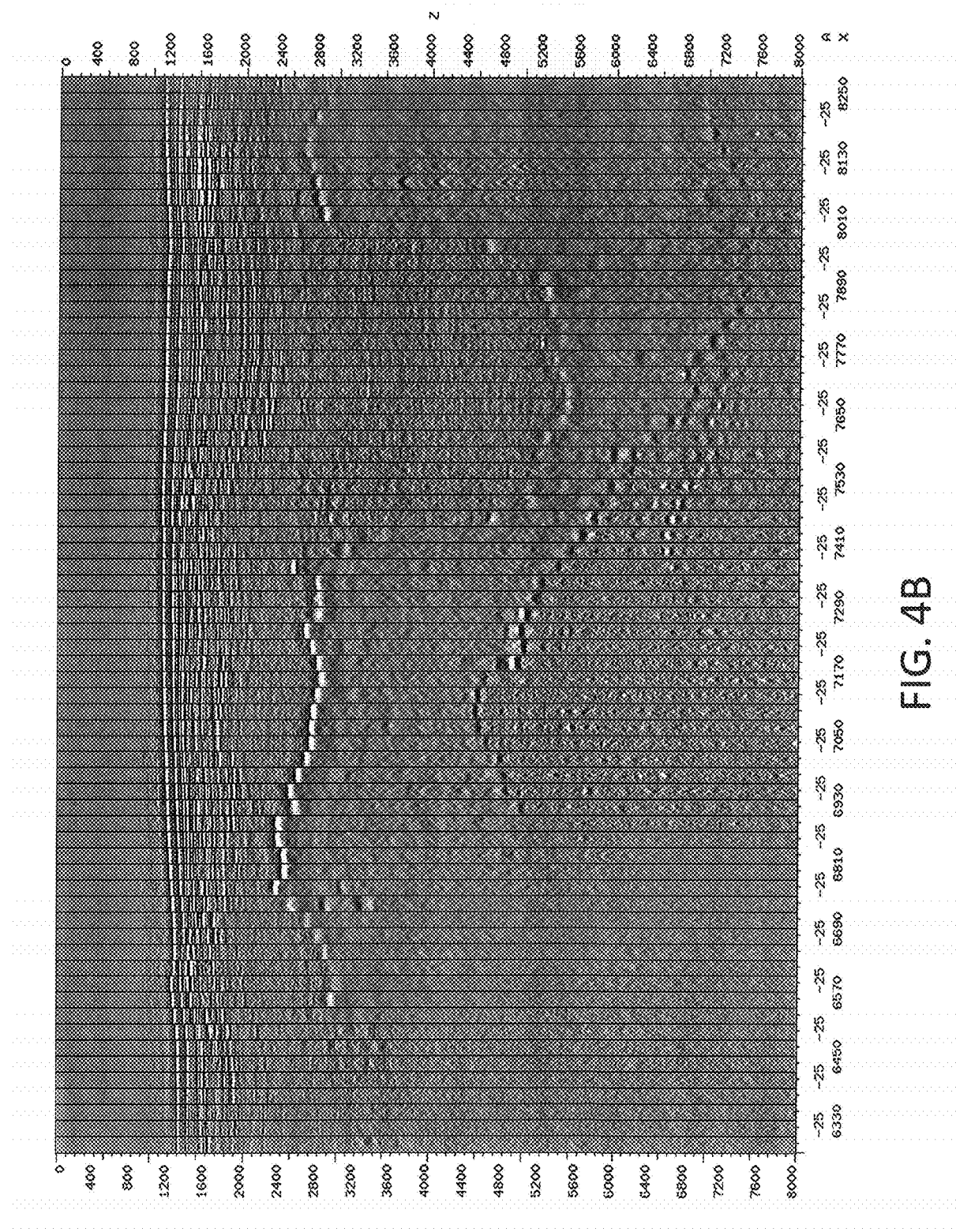
FIG. 4B shows a second example of angle gathers from multiples wavefields at a fixed azimuth angle of zero degrees in accordance with an embodiment of the invention.

Similarly, a comparison between FIGS. 4A and 4B shows that the features are more finely sampled and flatter in appearance within each panel in FIG. 4B. For example, consider the same bright feature that is approximately horizontal at a depth of roughly 2400-2800 meters at a range of inline positions (indicated by the "X" line under the graphic) of about 6700-7400 meters. That bright feature is seen to be distorted towards the edges of each panel in FIG. 4A, while being more finely sampled and flatter in appearance in each panel in FIG. 4B.

Figure 5A:
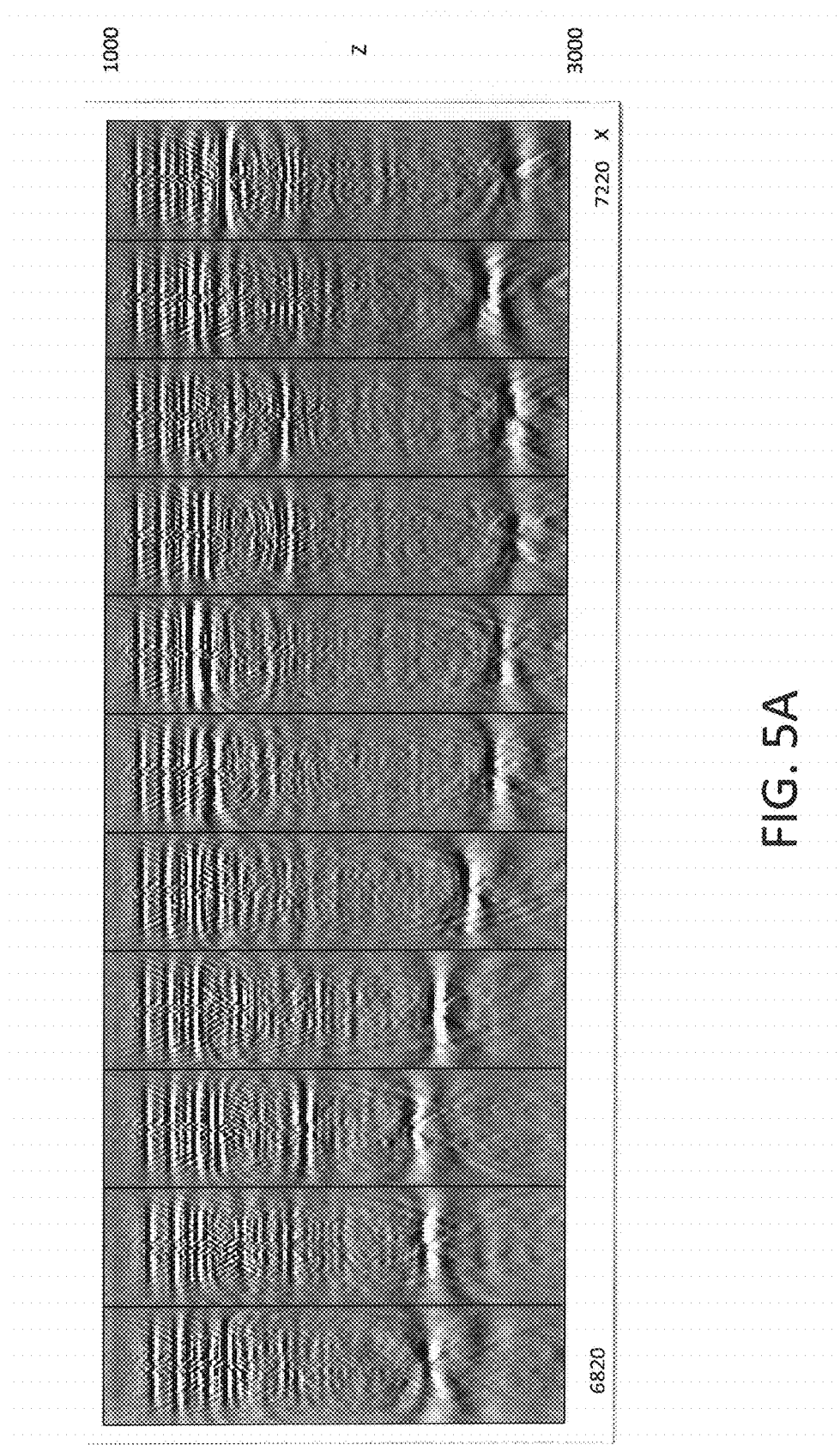
FIG. 5A shows a third example of angle gathers from primary wavefields at a fixed azimuth angle of zero degrees.
Figure 5B:
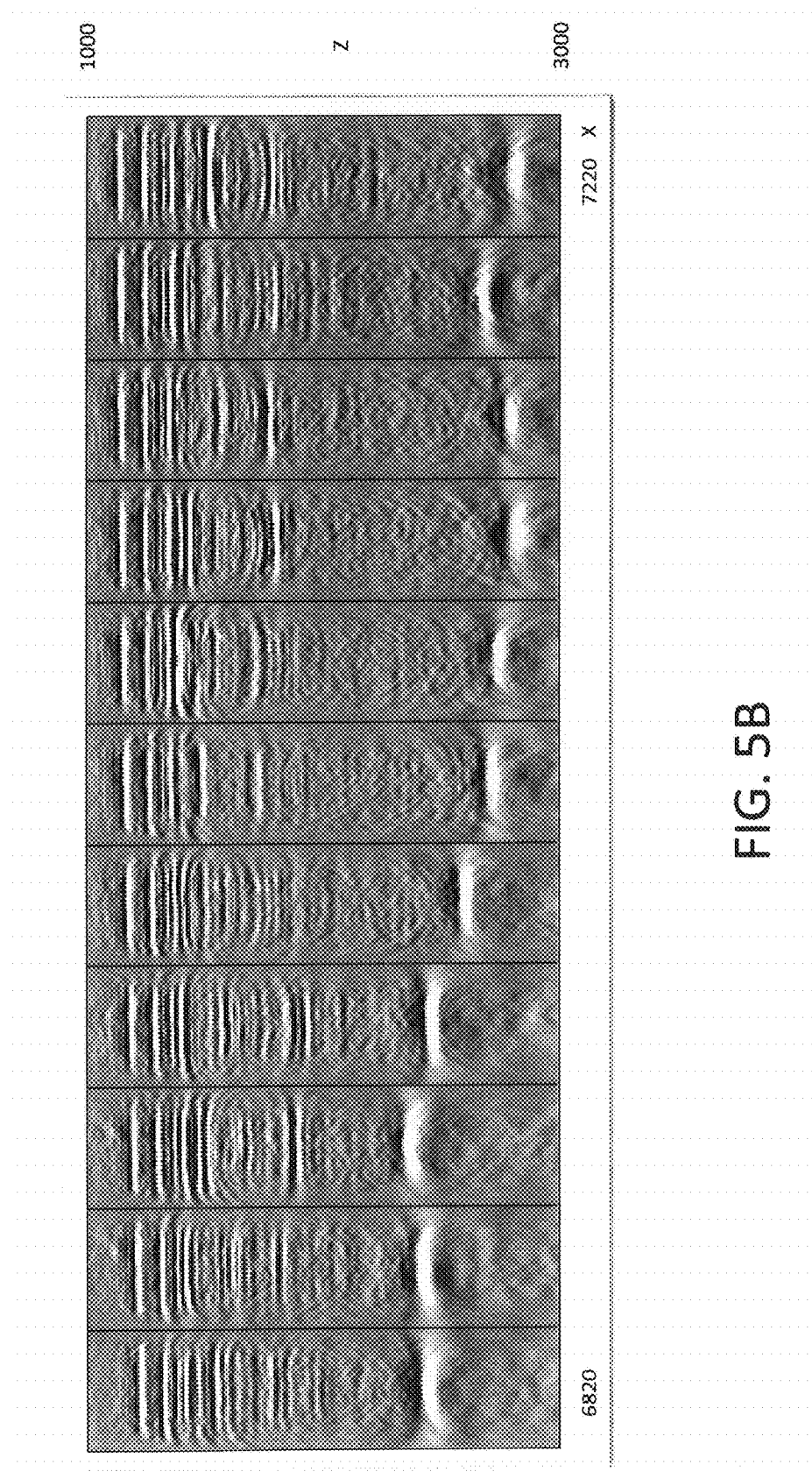
FIG. 5B shows a third example of angle gathers from multiples wavefields at a fixed azimuth angle of zero degrees in accordance with an embodiment of the invention.

A magnified view (with a smaller depth range and less panels) of the same bright feature is shown in FIGS. 5A and 5B, where a large range of angles are gathered. In these magnified views, the greater distortion towards the panel edges in FIG. 5A is clearly visible in comparison to the flatter and more finely sampled features within the panels of FIG. 5B.

Hence, as shown by FIGS. 3A through 5B, the zero-degree azimuth (i.e. inline) angle gathers from multiples wavefields imaging are more finely sampled than those from primary wavefields imaging. At the 90-degree azimuth (i.e. crossline) direction, the angle illumination from primary wavefields imaging is even more problematic.

In the 90-degree azimuth direction, large sail-line spacing causes coarse sub-line sampling; each sail-line may be 600 meters or even further apart. Due to the large shot spacing, there are only several sparsely distributed angles at the 90-degree azimuth direction. The large gaps between adjacent source locations in both inline and crossline directions causes low resolution and sparseness in common image gathers. The sparseness issue in the 90-degree azimuth direction is particularly problematic when imaging the shallow subsurface below a water bottom and/or a salt dome.

The present disclosure provides a solution to this issue by using multiples wavefields imaging to advantageously create densely populated angle gathers in the crossline direction. This solution effectively uses the down-going wavefield as a distributed secondary source (i.e. as an "aerial" source), which is more finely sampled than the point source.

Figure 6A:
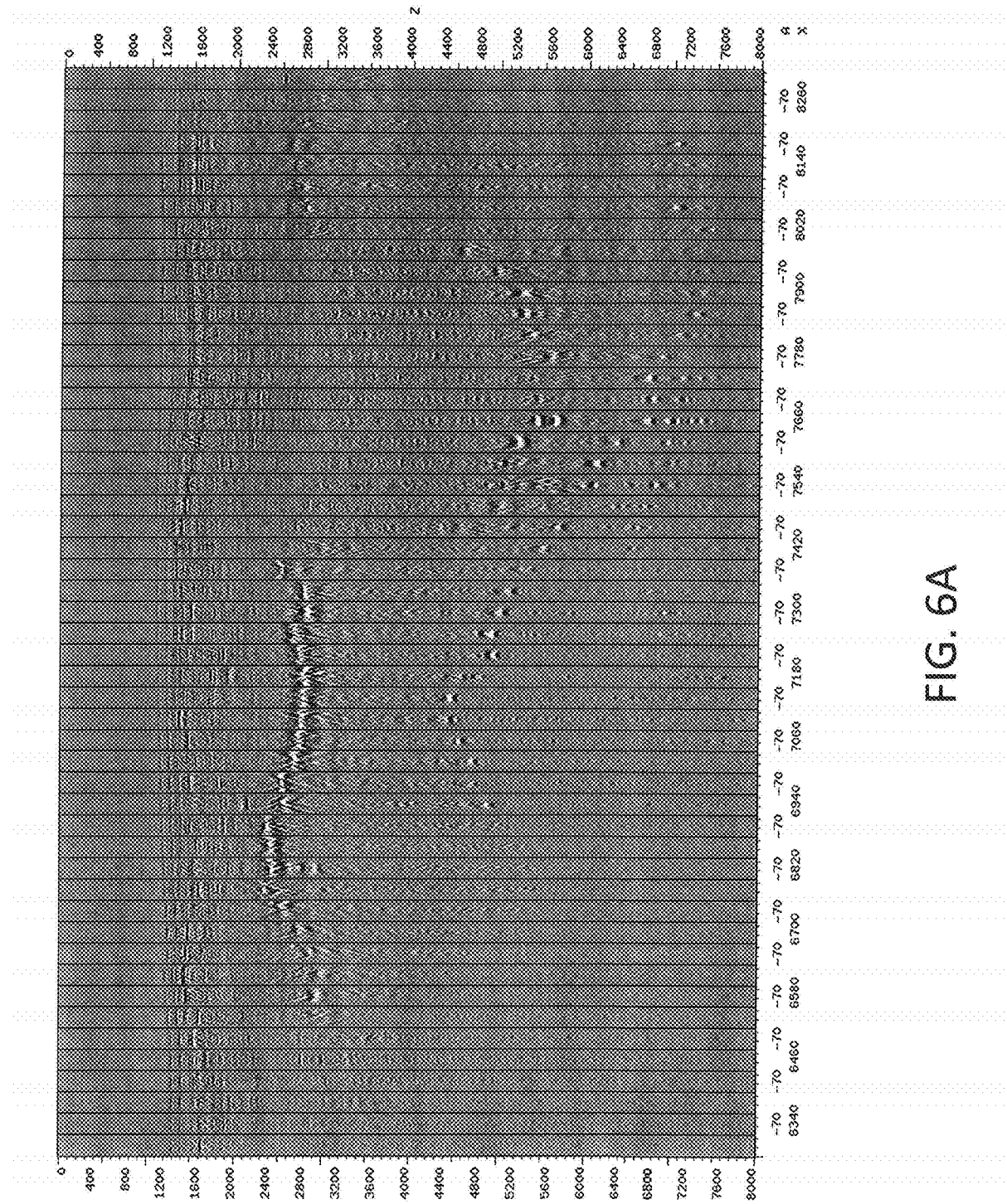
FIG. 6A shows a fourth example of angle gathers from primary wavefields at a fixed azimuth angle of ninety degrees.
Figure 6B:
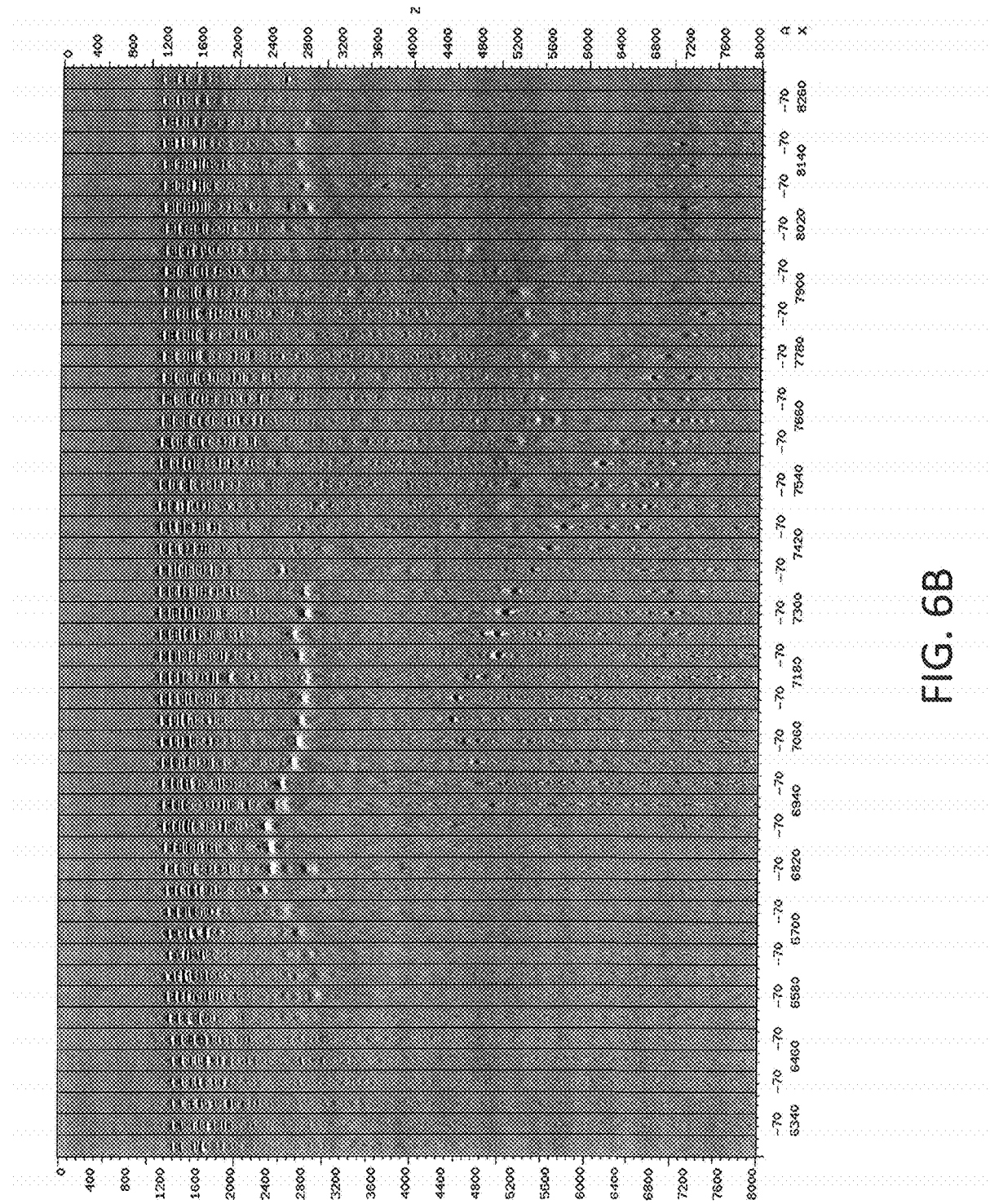
FIG. 6B shows a fourth example of angle gathers from multiples wavefields at a fixed azimuth angle of ninety degrees in accordance with an embodiment of the invention.

Similar to FIGS. 3A and 3B for the zero-degree azimuth (inline direction), a comparison between FIGS. 6A and 6B for the 90-degree azimuth (crossline direction) shows that the features are more finely sampled and flatter in appearance within each panel in FIG. 6B. For example, consider the same bright feature that is approximately horizontal at a depth of roughly 2400-2800 meters at a range of crossline positions (indicated by the "X" line under the graphic) of about 6700-7400 meters. That bright feature is seen to be distorted towards the edges of each panel in FIG. 6A, while being more finely sampled and flatter in appearance in each panel in FIG. 6B.

Figure 7A:
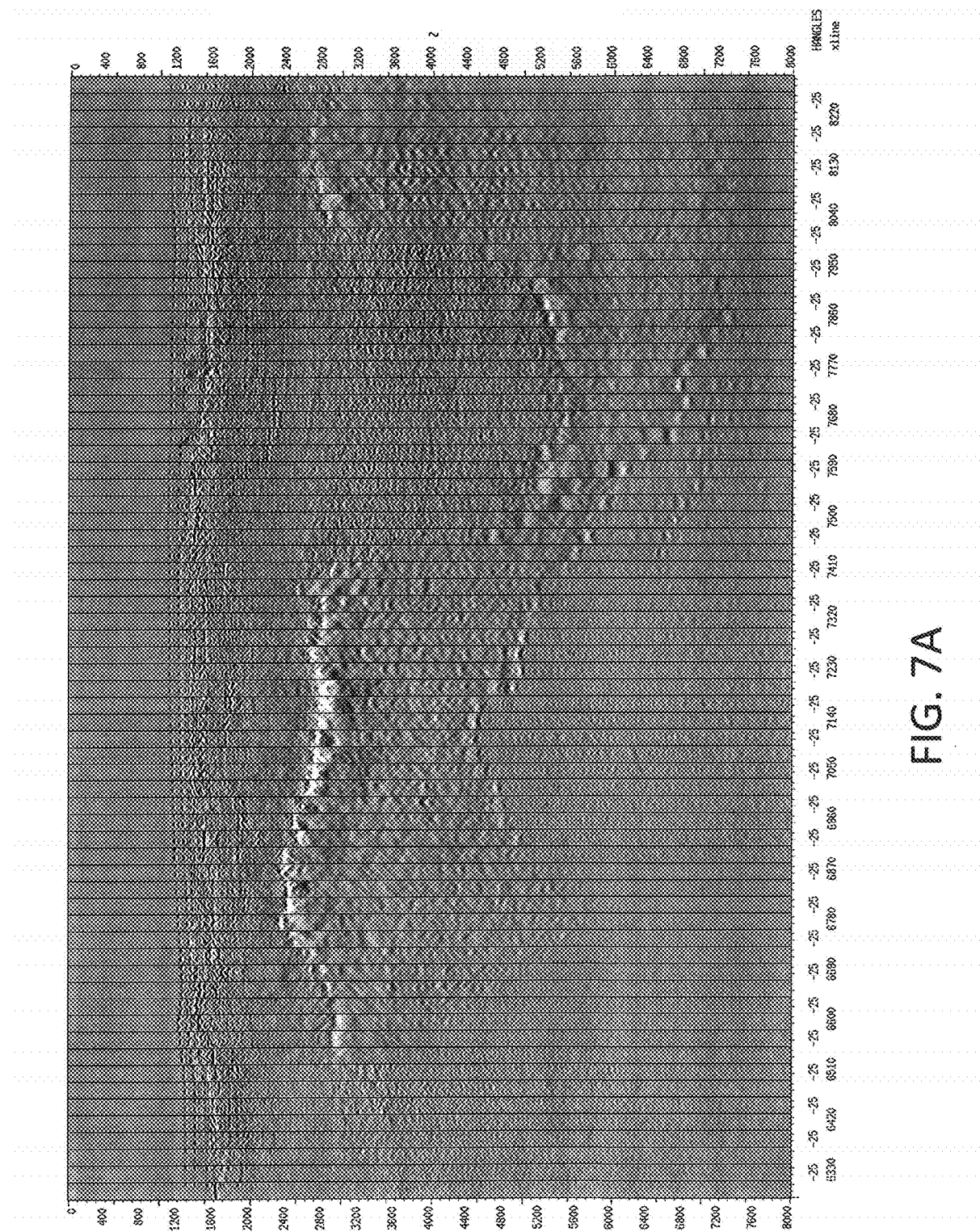
FIG. 7A shows a fifth example of angle gathers from primary wavefields at a fixed azimuth angle of ninety degrees.
Figure 7B:
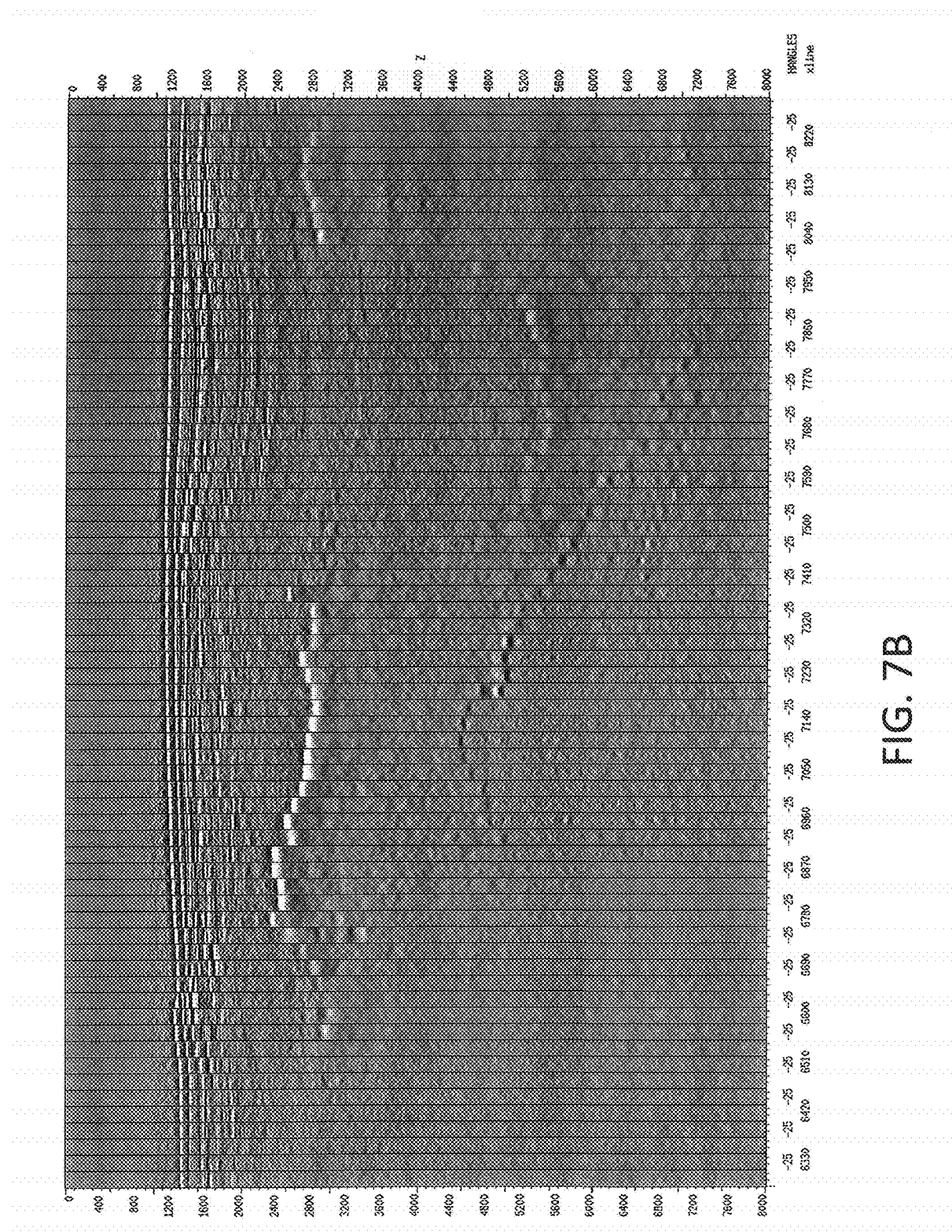
FIG. 7B shows a fifth example of angle gathers from multiples wavefields at a fixed azimuth angle of ninety degrees in accordance with an embodiment of the invention.

Similar to FIGS. 4A and 4B for the zero-degree azimuth (inline direction), a comparison between FIGS. 7A and 7B for the 90-degree azimuth (crossline direction) shows that the features are more finely sampled and flatter in appearance within each panel in FIG. 7B. For example, consider the same bright feature that is approximately horizontal at a depth of roughly 2400-2800 meters at a range of crossline positions (indicated by the "X" line under the graphic) of about 6700-7400 meters. That bright feature is seen to be distorted towards the edges of each panel in FIG. 7A, while being more finely sampled and flatter in appearance in each panel in FIG. 7B.

Figure 8A:
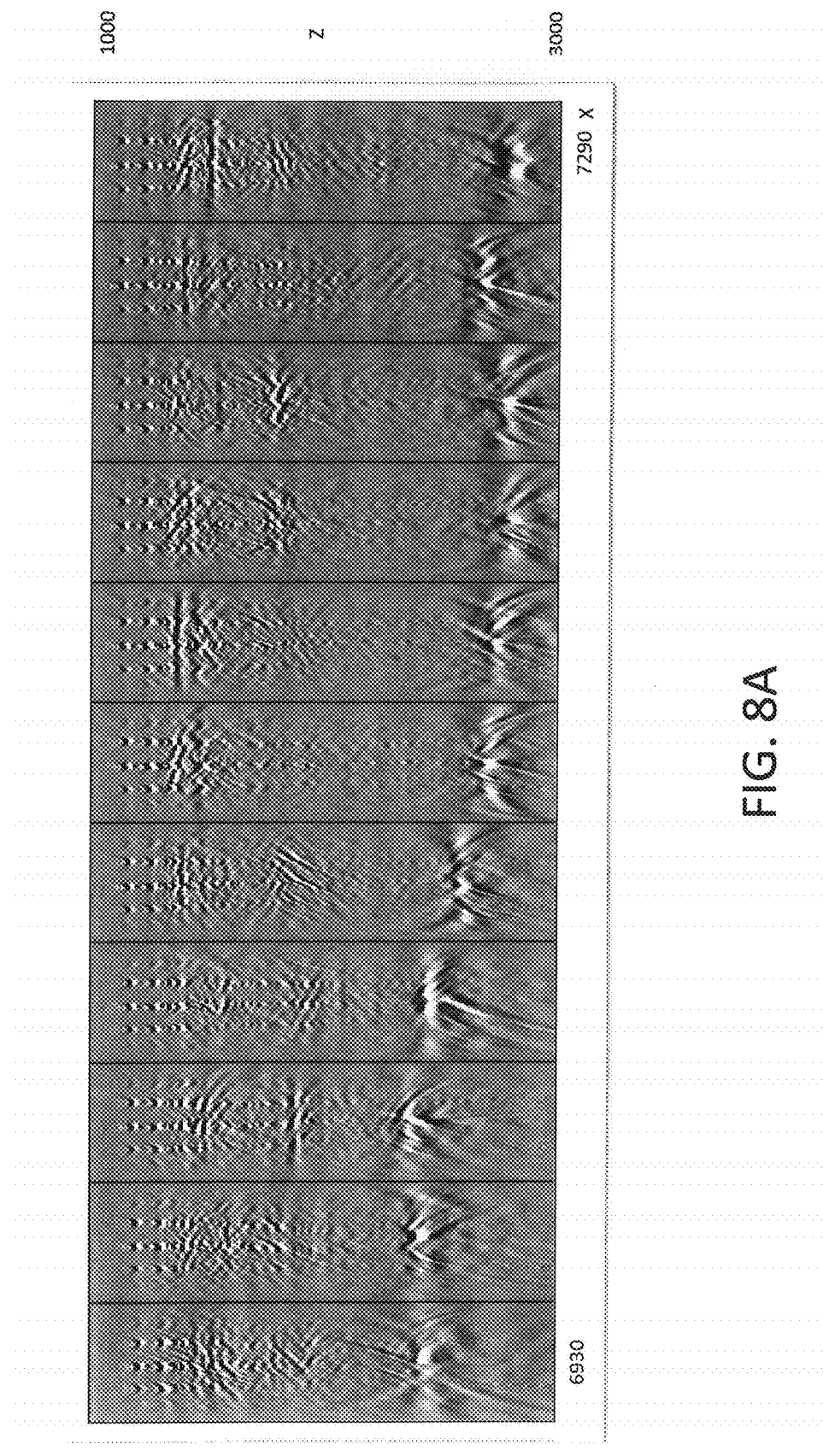
FIG. 8A shows a sixth example of angle gathers from primary wavefields at a fixed azimuth angle of ninety degrees.
Figure 8B:
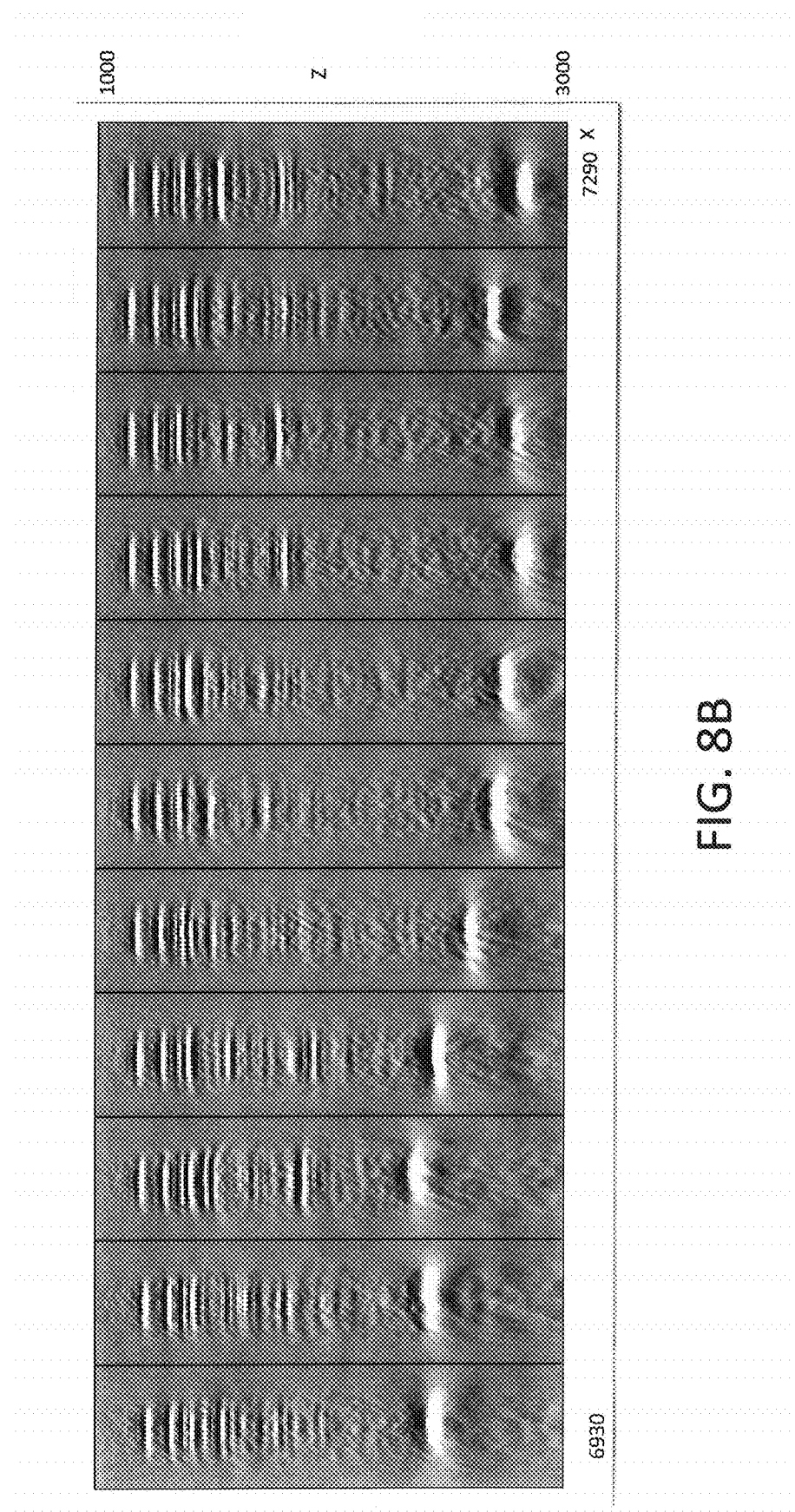
FIG. 8B shows a sixth example of angle gathers from multiples wavefields at a fixed azimuth angle of ninety degrees in accordance with an embodiment of the invention.

Similar to FIGS. 5A and 5B for the zero-degree azimuth (inline direction), magnified views (with a smaller depth range and less panels) of the same bright feature are shown in FIGS. 8A and 8B for the 90-degree azimuth (crossline direction), where a large range of angles are gathered. In these magnified views, the greater distortion towards the panel edges in FIG. 8A is clearly visible in comparison to the flatter and more finely sampled features within the panels of FIG. 8B.

Figure 9A:
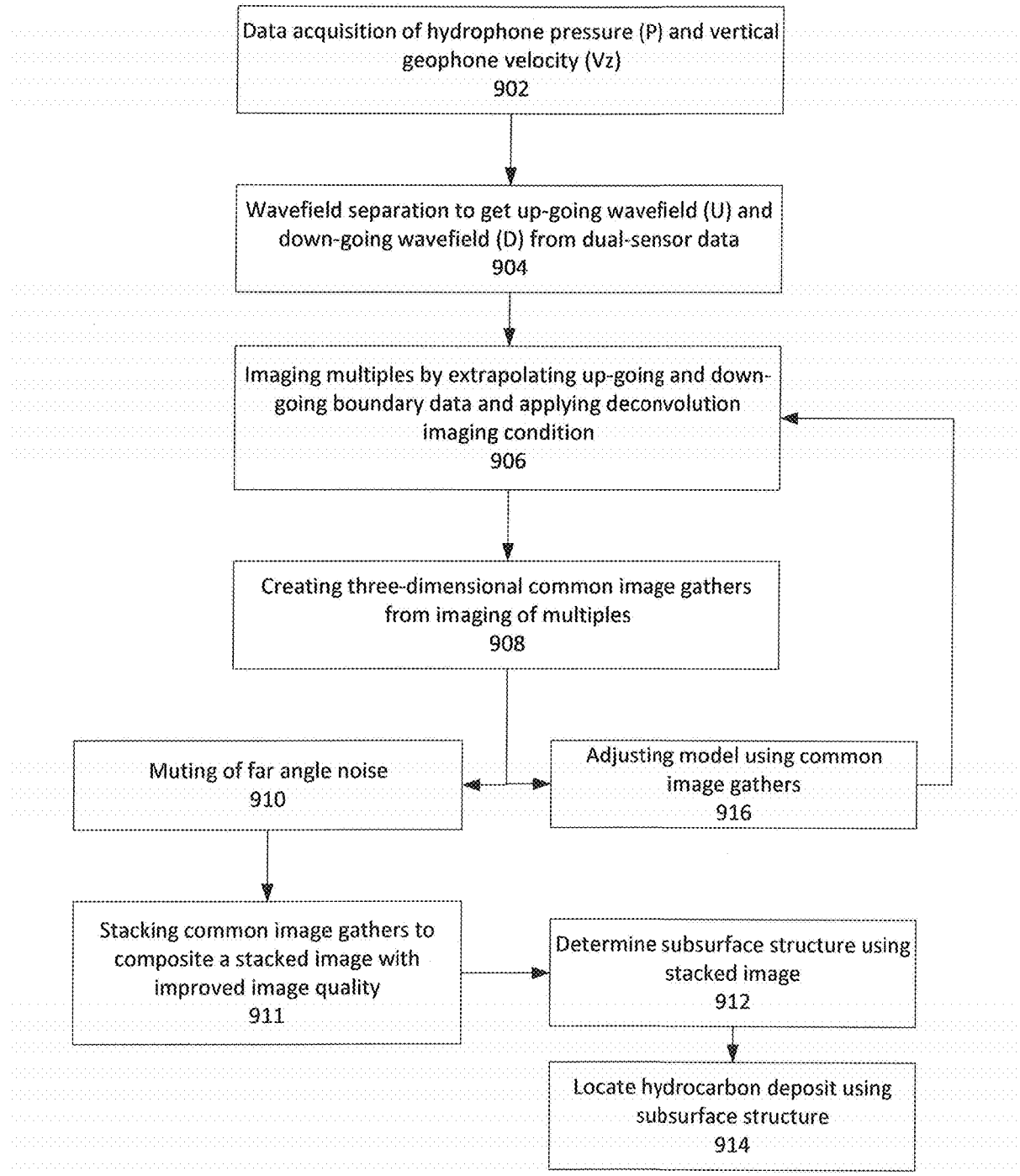
FIG. 9A is a flow chart showing a technological process of seismic imaging in accordance with an embodiment of the invention.

FIG. 9A is a flow chart showing a technological process 900 of seismic imaging in accordance with an embodiment of the invention. The technological process 900 may improve the limited quality of seismic images found in conventional processing of seismic data. The improved quality and accuracy of the resultant seismic images may be advantageously applied to more reliably and accurately determine the location and extent of recoverable hydrocarbons.

Per block 902, three-dimensional seismic sensor data may be acquired. In accordance with one embodiment, this step may be implemented using dual-sensor data acquisition so as to acquire two measured components in the three-dimensional seismic sensor data. For example, the three-dimensional seismic sensors may include hydrophones to measure pressure (P) and geophones to measure velocity, in particular vertical velocity (Vz) at a recording surface. As would be understood by one of ordinary skill in the art with the benefit of this disclosure, suitable alternatives to dual-sensor data acquisition would be any multi-sensor data acquisition which allows a mathematical separation of the up-going wavefields and down-going wavefields.

Per block 904, wave separation is performed on the seismic data. Using the wave separation, an up-going wavefield (U) and a down-going wavefield (D) may be obtained from the dual-sensor data.

Per block 906, imaging of multiples wavefields may be performed. The imaging of multiples wavefields may be performed by extrapolating (migrating) up-going and down-going boundary data and applying a deconvolution imaging condition. Extrapolating the up-going and down-going boundary data may involve extrapolation of the up-going and down-going wavefields from the recording surface to a reflector subsurface and applying an imaging condition at the reflector subsurface. The imaging condition may be a deconvolution imaging condition. Alternatively, the imaging condition may be a cross-correlation imaging condition.

Per block 908, three-dimensional common image gathers are generated from the imaging of multiples wavefields. In accordance with one embodiment of the invention, the three-dimensional common image gathers may be angle gathers. Creating the angle gathers may involve the imaging of multiples wavefields for a range of illumination angles (i.e. a range of polar angles of the incident/reflected wavefields). Example angle gathers generated from multiples wavefields are shown in FIGS. 3B, 4B, 5B, 6B, 7B and 8B, which are described above. Alternatively, the three-dimensional common image gathers may be offset image gathers over a range of offset displacements.

Per block 910, far angle noise may be muted (reduced) by filtering before stacking the gathers. In the angle gathers from multiples wavefields, it is advantageously easier to separate signal from noise. This is due to the noise being mostly at far angles, which is not so true for the angle gathers from primary wavefields. Due to the poor angular illumination in the angle gathers from primary wavefields, the signal and noise may be mixed together in the gather domain (for example, in the case of a top salt structural feature).

Per block 911, after muting the far angle noise, stacking of the common image gathers (in one embodiment, the angle gathers) may be performed. This composites a stacked image.

As demonstrated in the present disclosure, the resultant stacked image has improved image quality and accuracy compared against a conventional stacked image generated using primary wavefields. An example of an inline post stack image after stacking angle gathers from multiples wavefields is described below in relation to FIG. 10B. An example of a post stack depth slice after stacking angle gathers from multiples wavefields is described below in relation to FIG. 11B.

Per block 912, the stacked image may be used to identify the potential subsurface structure. Knowledge of the potential subsurface structure may be used, for example, in hydrocarbon exploration per block 914. In other words, the potential subsurface structure may be used to determine the location and extent of extractable hydrocarbon reserves so that drilling may be planned and performed.

Per block 916, in addition to creating and using the stacked image, the common image gathers (in one embodiment, the angle gathers) may also be utilized for model building. The model building may be velocity model building. Alternatively, the model building may be anisotropy parameter model building. In other words, the model that determines the propagation of wavefields in the subsurface layers may be adjusted or modified based on the common image gathers. The technological process 900 may then loop back to block 906 and perform the imaging of multiples wavefields where the extrapolation of up-going and down-going wavefields uses the modified model.

Figure 9B:
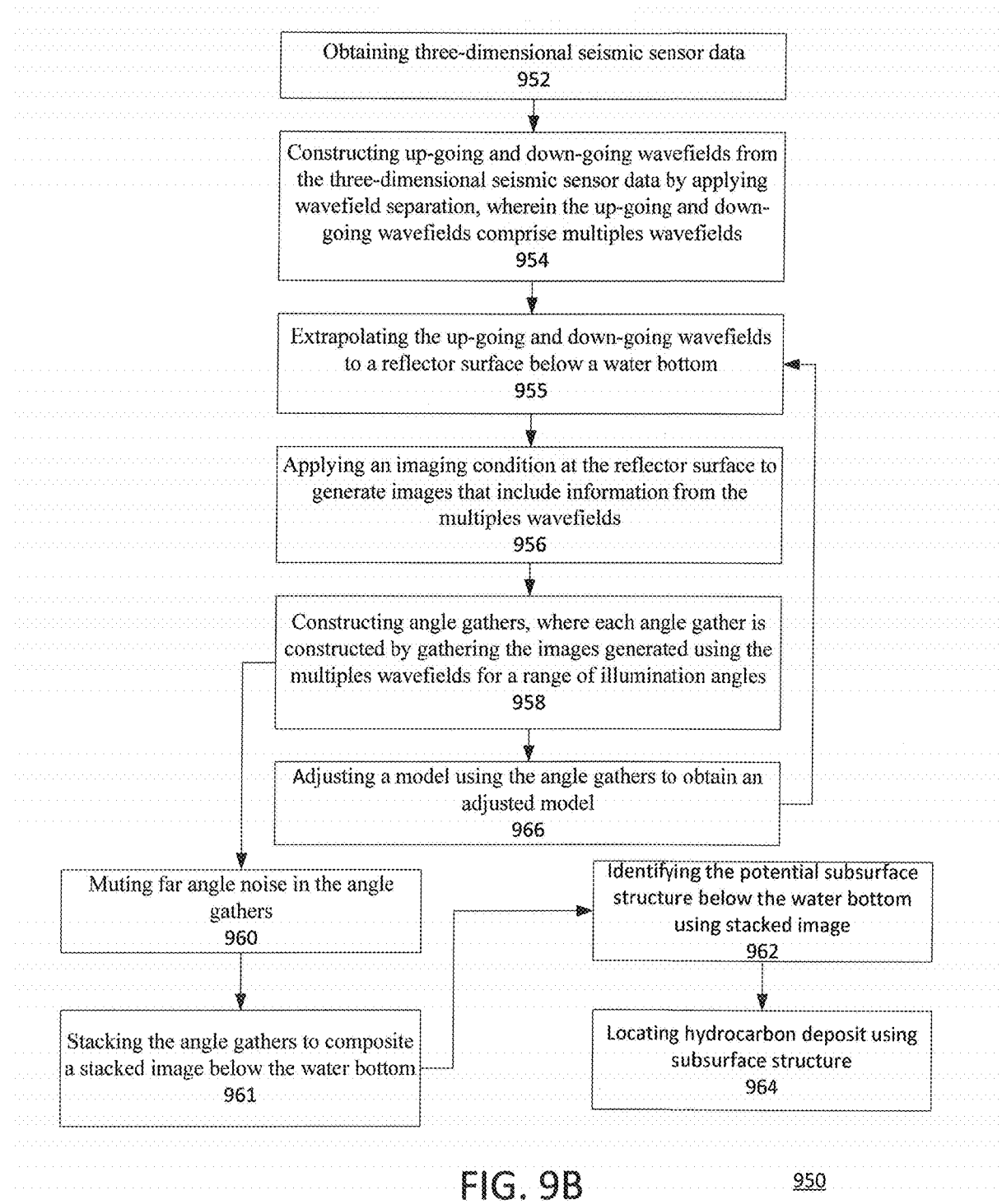
FIG. 9B is a flow chart showing a technological process of seismic imaging in accordance with another embodiment of the invention.

FIG. 9B is a flow chart showing a technological process 950 of seismic imaging in accordance with another embodiment of the invention. The technological process 950 may improve the limited quality of seismic images found in conventional processing of seismic data. The improved quality and accuracy of the resultant seismic images may be advantageously applied to more reliably and accurately determine the location and extent of recoverable hydrocarbons.

Per block 952, three-dimensional seismic sensor data may be obtained. Per block 954, up-going and down-going wavefields from the three-dimensional seismic sensor data may constructed by applying wavefield separation, wherein the up-going and down-going wavefields include multiples wavefields.

Per block 955, the up-going and down-going wavefields may be extrapolated to a reflector surface below a water bottom. Per block 956, an imaging condition may be applied at the reflector surface to generate images that include information from the multiples wavefields.

Per block 958, angle gathers may be constructed. Each angle gather may be constructed by gathering the images generated using the multiples wavefields for a range of illumination angles. Per block 960, far angle noise may be muted in the angle gathers. Per block 961, after muting the far angle noise, stacking of the angle gathers may be performed. This composites a stacked image.

Per block 962, the stacked image may be used to identify the potential subsurface structure. Knowledge of the potential subsurface structure may be used, for example, in hydrocarbon exploration per block 964. In other words, the potential subsurface structure may be used to determine the location and extent of extractable hydrocarbon reserves so that drilling may be planned and performed.

Per block 966, in addition to creating and using the stacked image, a model that determines the propagation of wavefields in the subsurface layers may be adjusted using the angle gathers to obtain an adjusted model. The technological process 950 may then loop back to block 955 and perform the extrapolation of up-going and down-going wavefields using the modified model.

Figure 10B:
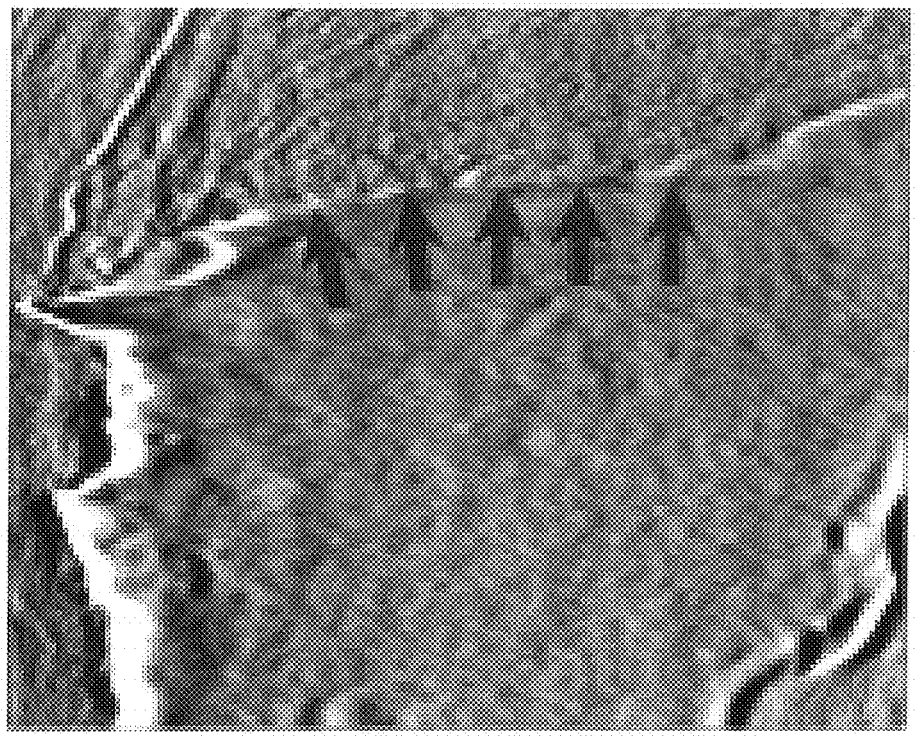
FIG. 10B shows an inline post stack image after stacking angle gathers from multiples wavefields in accordance with an embodiment of the invention.
Figure 10A:
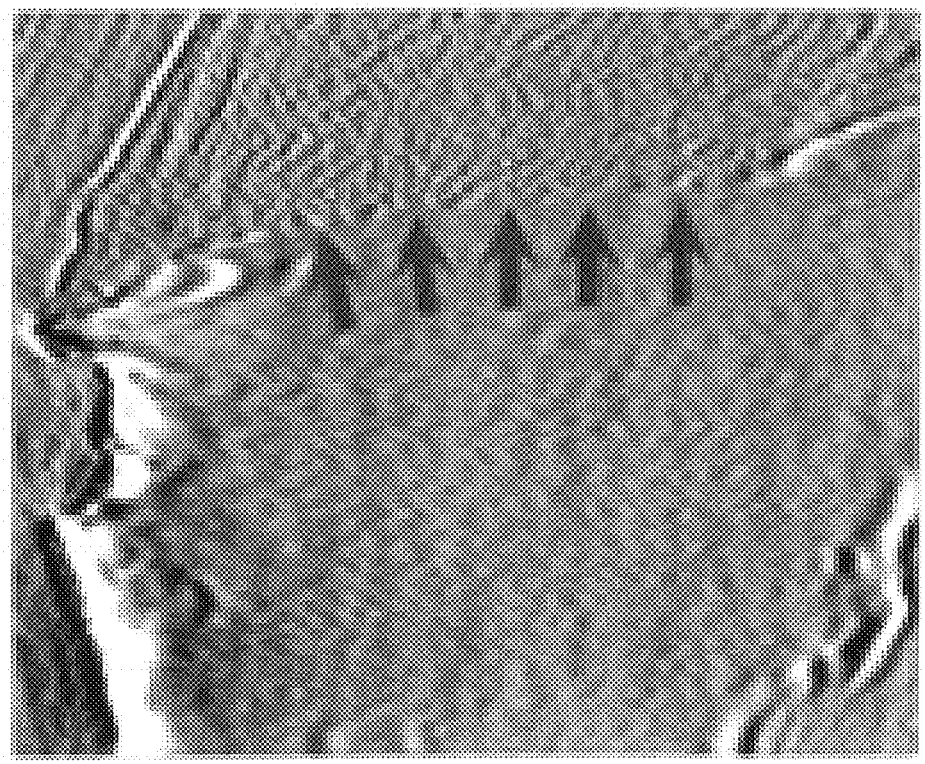
FIG. 10A shows an inline post stack image after stacking angle gathers from primary wavefields.

FIGS. 10A and 10B show inline post stack images after stacking angle gathers from primary wavefields and multiples wavefields, respectively. These figures provide a cross-sectional view of a region of interest below the sea floor. The arrows in these figures point to an edge feature in the cross-sectional view. By comparing FIGS. 10A and 10B, it is seen that the edge feature is substantially clearer and better defined in FIG. 10B. The higher quality image in FIG. 10B facilitates the determination of the border of a salt dome that resides on the left of the edge feature.

Figure 11A:
FIG. 11A shows a post stack depth slice after stacking angle gathers from primary wavefields.
Figure 11B:
FIG. 11B shows a post stack depth slice after stacking angle gathers from multiples wavefields in accordance with an embodiment of the invention.

FIGS. 11A and 11B show post stack depth slices after stacking angle gathers from primary wavefields and multiples wavefields, respectively. These figures provide a planar view of a region of interest below the sea floor. The arrows in these figures point to two edge features in the planar view. By comparing FIGS. 11A and 11B, it is seen that the edge features are substantially clearer and better defined in FIG. 11B. The higher quality image in FIG. 11B facilitates the determination of the borders of the salt dome that resides between the edge features.

Figure 12:
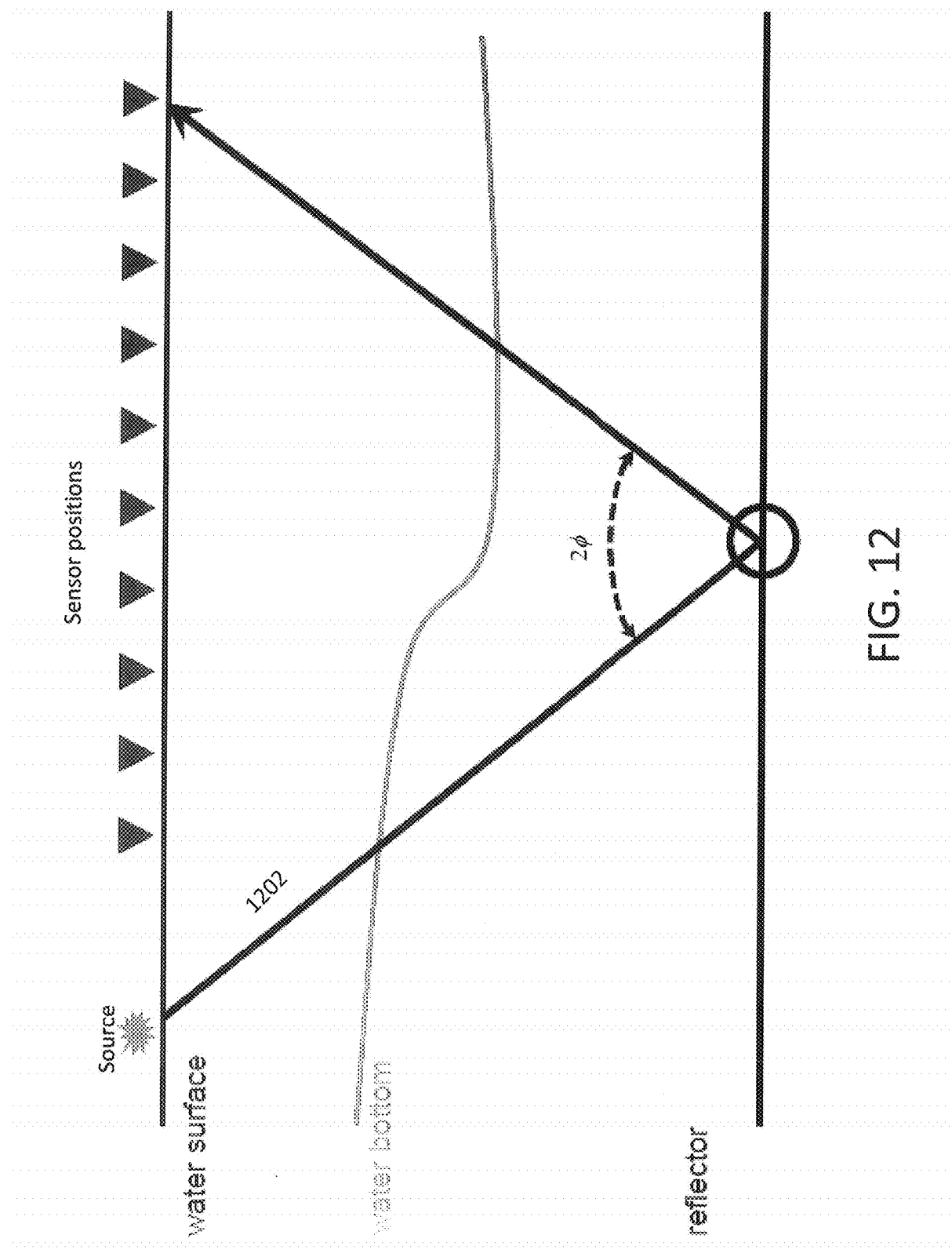
FIG. 12 is a schematic diagram depicting a path of an example primary wavefield.

FIG. 12 is a schematic diagram depicting a path of an example primary wavefield. Illustrative horizontal positions of a seismic energy source and seismic sensors are depicted near the water surface. Note that the seismic energy source and seismic sensors are generally below the water surface, not above as in the illustration.

The path 1202 of an example wave traveling from the seismic energy source to a horizontal "reflector" surface below the water bottom is depicted. The example wave may originate due to one shot at the seismic energy source and is reflected from the reflector to one of the seismic sensors near the water surface. The angle 2ϕ is the angle between the incident and reflected waves. The angle ϕ is the polar angle between the incident wave and the surface normal to the reflector surface. The angle ϕ is also the polar angle between the surface normal and the reflected wave.

The geometry depicted in FIG. 12 illustrates at least part of the reason as to why the angle of illumination is limited by a conventional technique that utilizes primary wavefields. As disclosed herein, further illumination angles may be provided by advantageously utilizing multiples wavefields.

Figure 13:
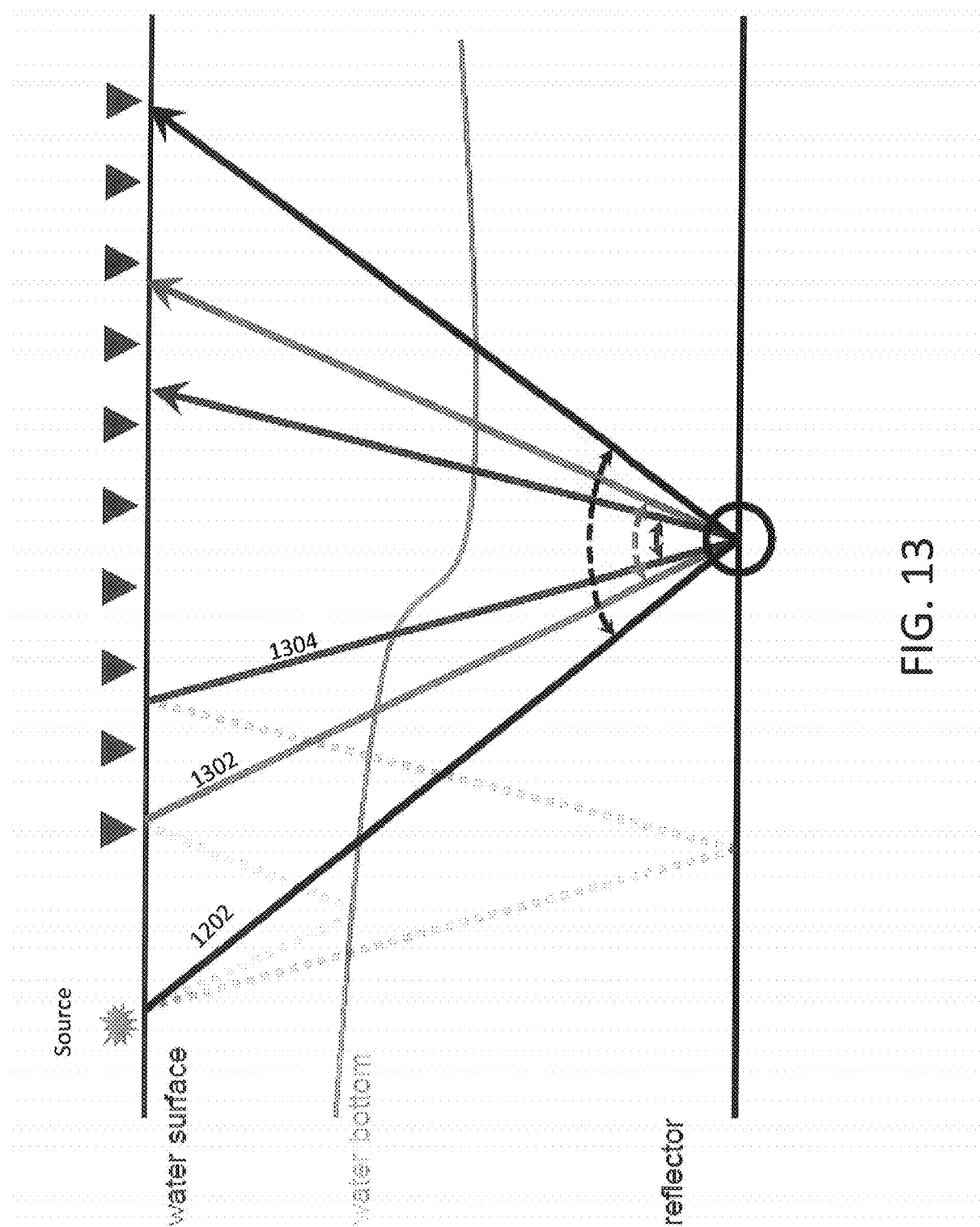
FIG. 13 depicts is a schematic diagram depicting paths of two example multiples wavefields in addition to the example primary wavefield in accordance with an embodiment of the invention.

FIG. 13 depicts is a schematic diagram depicting paths of two example multiples wavefields in addition to the example primary wavefield in accordance with an embodiment of the invention. The path 1202 of the example primary wavefield from FIG. 12 is shown in FIG. 13. In addition, two paths of multiples wavefields are depicted.

A first multiples wavefields path 1302 shown is of a wavefield that originates due to one shot at the seismic energy source, is reflected from the water bottom, is then reflected by the water surface before traveling to the reflector surface below the water bottom. The wavefield is then reflected from the reflector surface to a seismic sensor near the water surface. As illustrated, the first multiples wavefields path 1302 has a smaller illumination angle than the path 1202 of the primary reflected wavefield.

A second multiples wavefields path 1304 shown is of a wavefield that originates due to one shot at the seismic energy source, is reflected from the reflector surface, is then reflected by the water surface before traveling again to the reflector surface below the water bottom. The wavefield is then reflected from the reflector surface to a seismic sensor near the water surface. As illustrated, the second multiples wavefields path 1304 has a smaller illumination angle than the first multiples wavefields path 1302.

In summary, the illustration in FIG. 13 demonstrates that imaging of multiples wavefields may provide a greater diversity of reflection angles than imaging of primary wavefields.

Figure 14:
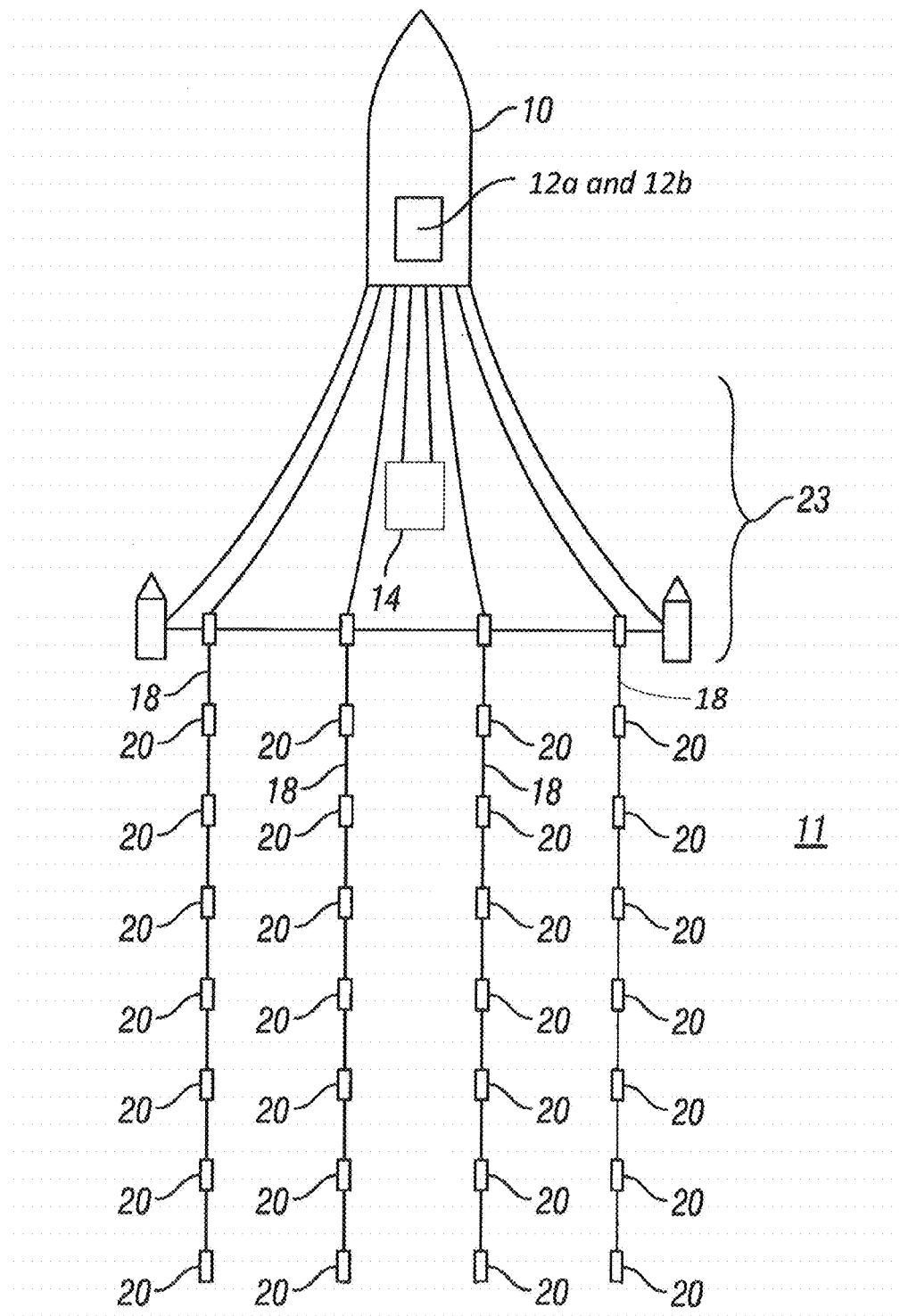
FIG. 14 shows in planar view an example arrangement for geophysical data acquisition in accordance with an embodiment of the invention.

FIG. 14 shows in planar view an example arrangement for three-dimensional geophysical data acquisition in accordance with an embodiment of the invention. The acquired seismic sensor data is three-dimensional in that it includes data from wavefields traveling in both inline and crossline directions. A seismic survey vessel 10 moves along the surface of a body of water 11, such as a lake or the ocean, in the inline direction. The illustrated arrangement provides for the towing of a seismic energy source 14 and a plurality of laterally spaced apart streamers 18 (spaced apart in the crossline direction).

The streamers 18 may be maintained in their relative lateral and longitudinal positions with respect to the vessel 10 using towing equipment 23. Each streamer 18 may include a plurality of longitudinally spaced-apart seismic sensors 20 thereon. Other seismic sensor arrangements may be used in other embodiments. As would be understood by one of ordinary skill in the art with the benefit of this disclosure, any wide azimuth array configuration may be suitable for data acquisition, including configurations where the seismic sensor array is towed along a curved path, and including configurations wherein the seismic sensor array not towed, but rather is located at or near the seafloor.

In one embodiment, each seismic sensor 20 may be a dual-sensor device. The dual-sensor device may include, for example, a pressure sensor and a vertical velocity sensor. Other multiple-sensor devices or multiple single-sensor devices may be used in alternate embodiments. As would be understood by one of ordinary skill in the art with the benefit of this disclosure, suitable alternatives to dual-sensor data acquisition would be any multi-sensor data acquisition which allows a mathematical separation of the up-going wavefields and down-going wavefields.

The vessel 10 may include a control system 12a and a recording system 12b. The control system 12a and the recording system 12b may be separate systems that communicate data between each other, or they may be sub-systems of an integrated system. The control system 12a may be configured for selectively actuating the seismic energy source 14, while the recording system 12b may be configured for recording the signals generated by seismic sensors (for example, seismic sensors 20) in response to the seismic energy imparted into the water 11 and thereby into subterranean material formations (e.g., rock formations) below the water bottom. The recording system 12b may be further configured to determine and record the geodetic positions of the seismic energy sources and the plurality of seismic sensors at any time.

Source actuation and signal recording by the array of seismic sensors may be repeated a plurality of times while the vessel moves through the water. Each shot record may include, for each seismic sensor, signals corresponding to the seismic energy produced by the seismic energy source.

The seismic data obtained in performing a seismic survey, representative of the Earth's subsurface, may be processed to yield information relating to the geologic structure and properties of the subsurface earth formations in the area being surveyed. The processed seismic data may be further processed for display and analysis of potential hydrocarbon content of these subterranean formations.

One goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the Earth in depth or time.

Images of the structure of the Earth's subsurface may be produced in order to enable an interpreter to select locations with the greatest probability of having petroleum accumulations. To verify the presence of petroleum, a well is generally drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface. The processing and display of acquired seismic data facilitates more accurate decisions on whether and where to drill, and thereby reduces the risk of drilling dry holes.

In accordance with an embodiment of the invention, a geophysical data product may be produced. The geophysical data product may include geophysical data, such as wavefield data, angle gathers, and/or stacked images, processed using the technique disclosed herein and stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis may be performed on the data product.

Figure 15:
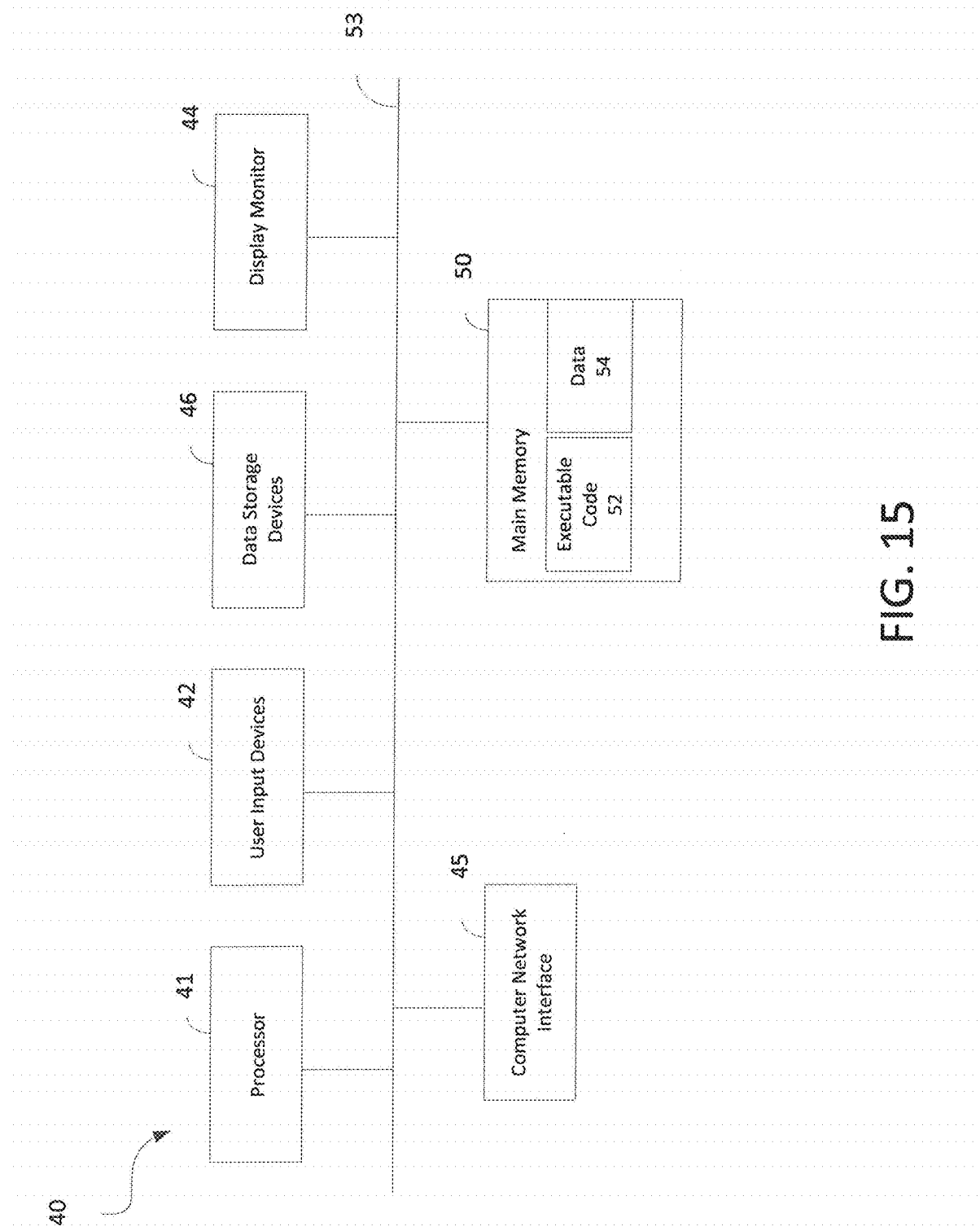
FIG. 15 shows a simplified example of a computer apparatus which may be used in performing processing steps in accordance with an embodiment of the invention.

FIG. 15 shows a simplified example of a computer apparatus 40 which may be used in performing processing steps disclosed herein in accordance with an embodiment of the invention. The computer apparatus 40 may be configured with executable instructions so as to perform the data processing methods described herein. This figure shows just one example of a computer which may be used to perform the data processing methods described herein. Other types of computers may also be employed, such as multi-processor computers, server computers, cloud computing via a computer network, and so forth.

The computer apparatus 40 may include a processor 41, such as those from the Intel Corporation of Santa Clara, Calif., for example. The computer apparatus 40 may have a bus system 43 communicatively interconnecting its various components. The computer apparatus 40 may include one or more user input devices 42 (e.g., keyboard, mouse), a display monitor 44 (e.g., LCD, flat panel monitor, CRT), a computer network interface 45 (e.g., network adapter, modem), and a data storage system which may include one or more data storage devices 46 (e.g., hard drive, solid state memory, optical disk drive, USB memory) and a main memory 50 (e.g., RAM).

In the example shown in this figure, the main memory 50 includes executable code 52 and data 54 stored therein The executable code 52 may comprise computer-readable program code (i.e., software) components which may be loaded from the data storage device 46 to the main memory 50 for execution by the processor 41. In particular, the executable code 52 may be configured to perform computer-implemented steps in the methods described herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A technological process for identifying a potential subsurface structure below a body of water, the technological process comprising:
   obtaining three-dimensional seismic sensor data,
   constructing up-going and down-going wavefields from the three-dimensional seismic sensor data by applying wavefield separation, wherein the up-going and down-going wavefields comprise multiples wavefields;
   extrapolating the up-going and down-going wavefields to a reflector surface below a water bottom;
   applying an imaging condition at the reflector surface to generate images that include information from the multiples wavefields;
   constructing angle gathers, where each angle gather is constructed by gathering the images generated using the multiples wavefields for a range of illumination angles;
   filtering the angle gathers to mute far angle noise in the angle gathers; and
   stacking the angle gathers to composite a stacked image for identifying the potential subsurface structure below the water bottom to aid in the identification of hydrocarbons for production.

2. The technological process of claim 1, wherein the stacked image comprises an inline post stack image.

3. The technological process of claim 1, wherein the stacked image comprises a post stack depth slice.

4. The technological process of claim 1, further comprising:
   adjusting a model using the angle gathers to obtain an adjusted model; and
   repeating said extrapolating, applying, constructing, and stacking steps, wherein said extrapolating uses the adjusted model.

5. The technological process of claim 1, wherein the three-dimensional seismic sensor data is obtained using a seismic energy source and a towed array of multiple streamers with a plurality of dual-sensor devices spaced apart on each streamer.

6. The technological process of claim 5, wherein an anti-parallel acquisition geometry is used to obtain the three-dimensional seismic sensor data.

7. The technological process of claim 1, wherein the three-dimensional seismic sensor data is obtained using multiple passes between a seismic energy source and a streamer having a plurality of dual-sensor devices spaced apart thereon.

8. The technological process of claim 1, wherein the three-dimensional seismic sensor data includes at least two measured components.

9. The technological process of claim 8, wherein said at least two measured components comprise pressure and a particle velocity.

10. The technological process of claim 1, wherein the up-going and down-going wavefields comprise both primary wavefields and multiples wavefields.

11. The technological process of claim 1, wherein the three-dimensional seismic sensor data includes seismic sensor data from wavefields traveling both inline and crossline, the multiples wavefields are due to multiplicative events which have undergone a plurality of reflections prior to detection, and wherein the illumination angles comprise polar angles of wavefields incident upon the reflector surface.

12. An apparatus for seismic imaging of a potential subsurface structure below a body of water to aid in identifying hydrocarbons for production, the apparatus comprising:
   data storage, including memory, for storing computer-readable code and data;
   a processor configured to execute the computer-readable code,
   wherein the computer-readable code
      obtains three-dimensional seismic sensor data,
      constructs up-going and down-going wavefields from the three-dimensional seismic sensor data by applying wavefield separation, wherein the up-going and down-going wavefields comprise multiples wavefields,
      extrapolates the up-going and down-going wavefields to a reflector surface below a water bottom,
      applies an imaging condition at the reflector surface to generate images that include information from the multiples wavefields, constructs angle gathers, where each angle gather is constructed by gathering the images generated using the multiples wavefields for a range of illumination angles;

filters the angle gathers to mute far angle noise in the angle gathers; and stacks the angle gathers to composite a stacked image for identifying the potential subsurface structure below the water bottom to aid in identifying hydrocarbons for production.

13. The apparatus of claim 12, wherein the computer-readable code adjusts a model using the common image gathers to obtain an adjusted model; and repeats extrapolating the up-going and down-going wavefields to the reflector surface below the water bottom using the adjusted model, applying the imaging condition at the reflector surface, constructing the angle gathers, and stacking the angle gathers.

14. The apparatus of claim 12, wherein the three-dimensional seismic sensor data is obtained using a seismic energy source and a towed array of multiple streamers with a plurality of dual-sensor devices spaced apart on each streamer.

15. The apparatus of claim 14, wherein an anti-parallel acquisition geometry is used to obtain the three-dimensional seismic sensor data.

16. The apparatus of claim 12, wherein the three-dimensional seismic sensor data is obtained using multiple passes between a seismic energy source and a streamer having a plurality of dual-sensor devices spaced apart thereon, and wherein the three-dimensional seismic sensor data includes at least two measured components.

17. The apparatus of claim 16, wherein the at least two measured components comprise pressure and a particle velocity.

18. The apparatus of claim 12, wherein the up-going and down-going wavefields comprise both primary wavefields and multiples wavefields.

19. The apparatus of claim 12, wherein the three-dimensional seismic sensor data includes seismic sensor data from wavefields traveling both inline and crossline, the multiples wavefields are due to multiplicative events which have undergone a plurality of reflections prior to detection, and the illumination angles comprise polar angles of wavefields incident upon the reflector surface.

20. At least one tangible computer-readable storage medium with non-volatile executable code stored thereon which, when executed by one or more processors, performs steps comprising:

obtaining three-dimensional seismic sensor data constructing up-going and down-going wavefields from the three-dimensional seismic sensor data by applying wavefield separation, wherein the up-going and down-going wavefields comprise multiples wavefields;

extrapolating the up-going and down-going wavefields to a reflector surface below a water bottom;

applying an imaging condition at the reflector surface to generate images that include information from the multiples wavefields;

constructing angle gathers, where each angle gather is constructed by gathering the images generated using the multiples wavefields for a range of illumination angles;

filtering the angle gathers to mute far angle noise in the angle gathers; and stacking the angle gathers to composite a stacked image for identifying the potential subsurface structure below the water bottom to aid in identifying hydrocarbons for production.

21. A technological process for generating a geophysical data product, the technological process comprising:

obtaining three-dimensional seismic sensor data;

constructing up-going and down-going wavefields from the three-dimensional seismic sensor data by applying wavefield separation, wherein the up-going and down-going wavefields comprise multiples wavefields;

extrapolating the up-going and down-going wavefields to a reflector surface below a water bottom;

applying an imaging condition at the reflector surface to generate images that include information from the multiples wavefields;

constructing angle gathers, where each angle gather is constructed by gathering the images generated using the multiples wavefields for a range of illumination angles;

filtering the angle gathers to mute far angle noise in the angle gathers; and stacking the angle gathers to composite a stacked image for identifying the potential subsurface structure below the water bottom to aid in identifying hydrocarbons for production.

22. The technological process of claim 21, further comprising recording the geophysical data product on a tangible, non-volatile computer-readable medium suitable for importing onshore.

23. The technological process of claim 22, further comprising performing geophysical analysis onshore on the geophysical data product.

* * * * *